(12) United States Patent
Viele et al.

(10) Patent No.: US 11,420,695 B2
(45) Date of Patent: Aug. 23, 2022

(54) SEMI-AUTONOMOUS TRAILER HAULER

(71) Applicant: Vieletech Inc., Florissant, CO (US)

(72) Inventors: Matthew Viele, Florissant, CO (US); David Glass, Columbus, IN (US)

(73) Assignee: Vieletech Inc., Florissant, CO (US)

( * ) Notice: Subject to any disclaimer, the term of this patent is extended or adjusted under 35 U.S.C. 154(b) by 472 days.

(21) Appl. No.: 16/263,551

(22) Filed: Jan. 31, 2019

(65) Prior Publication Data

US 2019/0233034 A1 Aug. 1, 2019

Related U.S. Application Data

(60) Provisional application No. 62/624,248, filed on Jan. 31, 2018.

(51) Int. Cl.
*B62D 59/04* (2006.01)
*B60D 1/36* (2006.01)
(Continued)

(52) U.S. Cl.
CPC ............... *B62D 59/04* (2013.01); *B60D 1/36* (2013.01); *B62D 53/005* (2013.01); *B60D 1/01* (2013.01);
(Continued)

(58) Field of Classification Search
CPC ............... G05D 1/021; B60W 60/0025; B60Y 2300/28; B62D 59/04; B62D 53/005;
(Continued)

(56) References Cited

U.S. PATENT DOCUMENTS 4,502,557 A * 3/1985 Anderson ............ B60T 11/107
180/14.2
4,897,642 A 1/1990 DiLuilo et al.
(Continued)

FOREIGN PATENT DOCUMENTS

DE 10-2017000289 A1 1/2017
SE 539 530 C2 10/2017

OTHER PUBLICATIONS

Retro Manufacturing, LLC, YouTube video entitled Autorestomod Review of RetroSound Model Two Classic Car Radio, uploaded on Jan. 18, 2013 Retrieved from the Internet: https://www.youtube.com/watch?v=X2aetJuO0D4, Sep. 24, 2020.

*Primary Examiner* — Minnah L Seoh
*Assistant Examiner* — Marlon A Arce
(74) *Attorney, Agent, or Firm* — Woodard, Emhardt, Henry, Reeves & Wagner, LLP

(57) ABSTRACT

An unmanned and self-powered vehicle or Towable Autonomous Dray (TOAD) may follow a vehicle and tow a trailer, haul a load, and/or recharge a pilot vehicle. The TOAD may be semi-autonomous and may attach to a pilot vehicle by an electronic identification. Further, wireless charging of the pilot vehicle may be provided by the TOAD. Smart trailer brakes, electric trailer axles, and a mechanically coupled tow vehicle may be provided by the TOAD in combination with additional units. A smart trailer controller may include a smart head unit and a smart tail unit in a trailer that may offer trailer security and increased safety. A smart trailer brake controller on the pilot vehicle and a smart module on the trailer may be applied where no unmanned vehicle is employed, such as, in a classic pick-up/trailer combination.

18 Claims, 16 Drawing Sheets

(51) Int. Cl.
  *B62D 53/00* (2006.01)
  *B62D 53/08* (2006.01)
  *B62D 49/00* (2006.01)
  *B60D 1/01* (2006.01)

(52) U.S. Cl.
  CPC ........ *B62D 49/007* (2013.01); *B62D 53/0864* (2013.01)

(58) Field of Classification Search
  CPC .... B62D 53/0864; B62D 49/007; B60D 1/36; B60D 1/01
  See application file for complete search history.

(56) References Cited

U.S. PATENT DOCUMENTS

| | | | |
|---|---|---|---|
| 5,295,551 A | | 3/1994 | Sukonick |
| 5,330,020 A * | | 7/1994 | Ketcham .................. B60T 7/20 180/14.2 |
| 5,394,924 A | | 3/1995 | Rejc |
| 5,397,924 A | | 5/1995 | Gee et al. |
| 5,434,552 A | | 7/1995 | Ems |
| 5,739,592 A | | 4/1998 | Rigsby et al. |
| 5,780,732 A | | 7/1998 | Gieseler et al. |
| 6,012,780 A | | 1/2000 | Duvernay |
| 6,222,443 B1 * | | 4/2001 | Beeson ................. B60D 1/065 307/10.1 |
| 6,419,037 B1 * | | 7/2002 | Kramer ................ B62D 53/005 180/14.2 |
| 6,494,476 B2 | | 12/2002 | Masters et al. |
| 6,553,288 B2 | | 4/2003 | Taguchi et al. |
| 7,115,070 B2 * | | 10/2006 | Stummer ................ B60K 5/08 477/205 |
| 7,118,513 B2 * | | 10/2006 | Stummer ............... B62D 53/00 477/2 |
| 7,397,363 B2 | | 7/2008 | Joao |
| 7,514,803 B2 | | 4/2009 | Wilks |
| 9,270,627 B1 * | | 2/2016 | Koo ........................ H04L 51/20 |
| 9,550,399 B2 | | 1/2017 | Jones et al. |
| 9,738,125 B1 | | 8/2017 | Brickley et al. |
| 9,956,965 B1 | | 5/2018 | Hall et al. |
| 10,007,271 B2 | | 6/2018 | Amla et al. |
| 10,108,202 B1 | | 10/2018 | Aikin et al. |
| 2001/0039230 A1 * | | 11/2001 | Severinsky .............. B60L 7/26 477/3 |
| 2004/0181317 A1 | | 9/2004 | Flechtner et al. |
| 2007/0222183 A1 * | | 9/2007 | Daniel ..................... B60D 1/52 280/479.1 |
| 2009/0093928 A1 | | 4/2009 | Getman et al. |
| 2010/0070149 A1 | | 3/2010 | Fry et al. |
| 2010/0158629 A1 | | 6/2010 | Morland |
| 2011/0287888 A1 * | | 11/2011 | Muller ................... B60K 6/442 477/3 |
| 2013/0041576 A1 | | 2/2013 | Switkes et al. |
| 2013/0253814 A1 | | 9/2013 | Wirthlin |
| 2013/0338848 A1 | | 12/2013 | Park |
| 2014/0054098 A1 * | | 2/2014 | Ferri ....................... B60D 1/06 180/14.1 |
| 2015/0137482 A1 | | 5/2015 | Woolf et al. |
| 2015/0165850 A1 | | 6/2015 | Chiu et al. |
| 2015/0367844 A1 | | 12/2015 | Tagesson et al. |
| 2016/0039456 A1 | | 2/2016 | Lavoie et al. |
| 2016/0049020 A1 | | 2/2016 | Kuehnle et al. |
| 2016/0221492 A1 * | | 8/2016 | Stender ................ B60G 17/017 |
| 2016/0244039 A1 | | 8/2016 | Rizzo et al. |
| 2016/0257341 A1 | | 9/2016 | Lavoie et al. |
| 2016/0337322 A1 * | | 11/2016 | Kang ..................... H04L 63/08 |
| 2017/0089697 A1 | | 3/2017 | Shepard |
| 2017/0168504 A1 | | 6/2017 | Darms et al. |
| 2017/0287320 A1 * | | 10/2017 | Meade ................... G08C 17/02 |
| 2017/0305436 A1 | | 10/2017 | Maskell et al. |
| 2018/0037261 A1 | | 2/2018 | Shepard |
| 2018/0061239 A1 | | 3/2018 | Prasad et al. |
| 2018/0099712 A1 | | 4/2018 | Bean et al. |
| 2018/0239362 A1 | | 8/2018 | Amla et al. |
| 2019/0047346 A1 | | 2/2019 | Carpenter |
| 2019/0084537 A1 | | 3/2019 | Kasper et al. |
| 2019/0187716 A1 * | | 6/2019 | Cantrell .................. G05D 1/0088 |
| 2019/0217674 A1 | | 7/2019 | Schutt |
| 2020/0047579 A1 | | 2/2020 | Crooks |
| 2020/0198596 A1 * | | 6/2020 | Houle ..................... B60D 1/06 |
| 2020/0384818 A1 | | 12/2020 | Giaier et al. |

\* cited by examiner

SEMI-AUTONOMOUS TRAILER HAULER

CROSS REFERENCE TO RELATED APPLICATIONS

This application claims the benefit of U.S. Provisional Patent Application No. 62/624,248, filed on Jan. 31, 2018, which is hereby incorporated by reference.

BACKGROUND

Most drivers on a daily basis do not need the typical hauling or towing capacity of trucks. Only occasionally does the driver actually need such higher hauling capabilities. Recreational vehicles, horse trailers, boats, and equipment trailers are all popular types of towed equipment. However, not all vehicles are capable of towing such equipment. For instance, battery powered Electric Vehicles (EVs) and plug in Hybrid Electric Vehicles (HEVs) are a new class of vehicles that are both enjoyable to drive and fuel efficient but are generally not appropriate to tow a large trailer. A moderately sized trailer typically requires in excess of 100 kilowatts (kW) to tow on flat ground at highway speeds. The best EVs today have 100 kWh of battery resulting in about a 1 hour (or 70 miles) range. This range is far too short for most trailer applications. Most daily commutes, however, do not require a truck, but a pick-up truck is always handy during moving, for home building projects, or for towing campers when on vacation. As a result, most drivers undesirably face the dilemma of buying such a vehicle, such as a truck or Sport Utility Vehicle (SUV), with higher hauling capacities than is normally needed, or temporarily renting or borrowing one. Such options can be both difficult and expensive. Moreover, trucks and SUVs tend to be less environmentally friendly as compared to EVs or HEVs.

Thus, there is a need for improvement in this field.

SUMMARY

An unmanned and self-powered vehicle ("unmanned vehicle" or "Towable Autonomous Dray (TOAD)") may be designed to follow a conventional vehicle and tow one or more trailers, haul a load, and/or recharge a pilot vehicle. It should be appreciated that the pilot vehicle may be a main vehicle that may be driven by a driver. It should also be appreciated that the pilot vehicle may be an autonomous vehicle. It should be appreciated that the unmanned vehicle may be made of heavy steel body panels that may not be susceptible to denting or becoming damaged easily. The unmanned vehicle may include a liquid/gaseous fueled power plant that may provide power that may be sent to the pilot vehicle or unit wheels mechanically and/or electrically. A mechanical transmission and/or an electrical coupling may be utilized to transmit power. It should be appreciated that power may be sent by utilizing a hydraulic system in embodiments of the present disclosure. It should be appreciated that the unmanned vehicle may provide the benefits of a fully autonomous tow/haul vehicle without being required to wait for fully autonomous vehicles to be ready in the marketplace or operable.

The unmanned vehicle may communicate vehicle dynamics to a pilot vehicle by utilizing wireless, wired, and/or manual transmission of information recorded on a datasheet that users or drivers may maintain. The unmanned vehicle may charge Battery Electric Vehicles (BEVs) over wired and/or wireless links.

Further, the unmanned vehicle may be physically coupled to a pilot vehicle or may be semi-autonomous by tracking the pilot vehicle. It should be appreciated that if the unmanned vehicle is physically coupled to the pilot vehicle, the unmanned vehicle may maintain a matching force with the pilot vehicle. It should also be appreciated that the force may be matched by utilizing a soft coupling and measuring the distance of the coupling, pitch from gyros, and torque on hitches. The unmanned vehicle may be assigned to a different pilot vehicle via an encrypted key. Further, audible, visual (dash or Heads-Up Display (HUD)), and haptic feedback may be provided that may help a driver of a pilot vehicle understand trailer conditions. Unmanned vehicles may utilize differential braking and/or wheel motors that may allow tight turning.

In embodiments of the present disclosure, an unmanned vehicle may split a pickup truck or a large sports utility vehicle (SUV) into an efficient passenger vehicle, such as a battery electric vehicle (BEV) with a passenger cabin including, but not limited to, a Tesla model X, and a "diesel-electric" bed, range extender, and/or a trailer tow unit. An unmanned vehicle may intelligently follow another vehicle or unit and may provide ease of implementation as compared to a fully autonomous vehicle. The unmanned vehicle may allow users to utilize a mid-size or SUV BEV for a vast majority of trips that do not require a pickup truck. The unmanned vehicle may provide towing power and hauling in a separate unit that may primarily remain stationary or parked at a home location. As a result, power plant sizing may be more accurately and efficiently determined and designed. It should be appreciated that the unmanned vehicle coupling may be mechanical and/or semi-autonomous. It should also be appreciated that platooning behind a pilot vehicle and providing power to the BEV and trailer may be provided through umbilical chargers or wirelessly. It should be appreciated that the unmanned vehicle may prevent or avoid accident scenarios by utilizing equipment including, but not limited to, a camera, LIght Detection and Ranging (LIDAR), sonar, and radar. It should also be appreciated that the unmanned vehicle may be fully autonomous and may communicate driving aids to the pilot vehicle. It should further be appreciated that smart electric axles for trailers may be provided and may be connected to a power unit that may provide power and stability to the unmanned vehicle and connected units. It should be appreciated that the unmanned vehicle may result in millions of conventional pickup trucks being taken off the road and replaced with BEV SUVs and cars. It should be appreciated that the unmanned vehicle may provide parking assistance to connected vehicles or units and drivers.

In one embodiment, the unmanned vehicle powertrain may provide a mechanical drivetrain and a two-mode hybrid transmission. The unmanned vehicle powertrain may provide a mechanical drivetrain with additional wheel motors. The wheel motors may provide additional maneuverability by driving in opposite directions and may allow the unmanned vehicle to turn in place in a similar fashion to a skid-steer loader.

In certain forms, the unmanned vehicle may be connected to the pilot vehicle by a conventional tow ball and receiver hitch. It should be appreciated that connection may be a flexible or a semi-flexible coupling that may be intended to guide the unmanned vehicle. The unmanned vehicle according to embodiments of the present disclosure may provide torque or braking to zero out the force on the ball by utilizing displacement, pitch, and tow vehicle Controller Area Network (CAN) information. The unmanned vehicle may have its own engine, transmission, and electric generator. It should be appreciated that the unmanned vehicle may be utilized to charge an Electric Vehicle (EV) pilot vehicle over an umbilical charger as well as for powering one or more trailers. The unmanned vehicle may send commands to the pilot vehicle to derate the pilot vehicle and match the acceleration and braking performance of the unmanned vehicle by utilizing a wired or wireless connection. It should be appreciated that the unmanned vehicle may be operated independently of a pilot vehicle by means including a mobile application or an embedded controller or joystick for maneuvering or parking vehicles or units.

In other embodiments of the present disclosure, a semi-autonomous operation may be utilized including attaching an unmanned vehicle to a pilot vehicle by electronic identification, such as via a receiver hitch. It should be appreciated the semi-autonomous operation may not provide a mechanical coupling between the unmanned vehicle and pilot vehicle. It should also be appreciated that an umbilical charger may be provided. The semi-autonomous operation may provide an option to wirelessly charge a pilot vehicle if one is attached to the unmanned vehicle. It should be appreciated that a pilot vehicle may be derated and may match the performance of the unmanned vehicle and trailer (s). It should also be appreciated that a rental charger may follow a vehicle or unit from one gas station or charging station to another gas station or the next charging station, and may be self-battery powered.

In additional embodiments of the present disclosure, the unmanned vehicle may conserve energy. It should be appreciated that the total energy used in the U.S. may be approximately 97.4 quadrillion BTU/year. It should also be appreciated that energy used by light trucks may be approximately 9.4 quadrillion BTU/year and approximately 3.1 quadrillion BTU/year used by pickups. Unmanned vehicles may reduce these rates of energy consumption. It should be appreciated that industry assumptions regarding reducing rates of energy consumption have not been successful and have included replacing pickup cabs with 7-seat BEV that in 2017 offered 19 miles per gallon (MPG) or 33 MPG to 92 MPG or 92 MPG, respectively, by 2025. It should be appreciated that CAFE Regulations require 33 MPG by 2025, and unmanned vehicles may be a solution to meeting this requirement. It should be appreciated that half of 200 miles or longer trips may be completed in a car and unmanned vehicle combination that may provide less than approximately 38% of Vehicle Miles Traveled (VMT). Unmanned vehicles may consume approximately 39% out of 53% of the fuel of a pickup only and may provide approximately 75% efficiency of a pickup. Unmanned vehicles may be smaller and/or lighter than pickups and may always platoon rather than haul. Unmanned vehicles may provide an approximately 25% replacement ratio, or replace approximately 25% of pickups with approximately 625,000 unmanned vehicles per year, and may offer approximately 0.47/0.36 quad BTU/year of savings.

It should be appreciated that the unmanned vehicle may greatly reduce U.S. transportation energy consumption by eliminating requiring pickup trucks to transport loads. It should be appreciated that the unmanned vehicle may provide consumers with an ability to tow and haul and may provide original equipment manufacturers (OEM) with an ability to optimize vehicles for normal commuting. It should be appreciated that air damping may be incorporated into the unmanned vehicle. It should also be appreciated that the unmanned vehicles may have a clearance that may be similar to clearance for pickup trucks, such as a Ford F250.

It should further be appreciated that the unmanned vehicle may provide OEM support that may utilize driver-assisted feedback to record and provide trailer performance. It should also be appreciated that a durable lockbox may be provided on the unmanned vehicle and/or connected vehicles or units that may provide a secure storage space.

In embodiments of the present disclosure, the unmanned vehicle may provide a plurality of models that may be sized for different power requirements. For example, one unmanned vehicle may be provided by a model that may be configured to have a 24,000-pound (lb.) tow rating at 600 horsepower (hp) and another unmanned vehicle may be provided by another model that may be configured to have a 7,000-lb tow rating at 200 hp. It should be appreciated that additional models of the unmanned vehicle may be configured to tow other load sizes including, but not limited to, a 15,000-lb tow rating at 400 hp and 0 tow rating with a 1,500 lb. bed rating. It should be appreciated that the acceleration of a fully loaded unmanned vehicle may be reduced. It should also be appreciated that a top speed of the unmanned vehicle may be electronically governed at approximately 85 miles per hour or a speed set by an appropriate jurisdiction. It should further be appreciated that a range for passenger cars and light trucks may be between approximately 400 and 500 miles when fully loaded and may utilize a 50-gallon tank for the largest size vehicle.

In embodiments of the present disclosure, the unmanned vehicle may provide a distance algorithm that may be utilized to prevent accidents. The algorithm may provide straight line braking to stop in scenarios including, but not limited to, broadsiding a pilot vehicle, broadsiding a trailer, broadsiding the unmanned vehicle, sideswiping the trailer, and sideswiping the pilot vehicle. An intelligent brake controller and anti-sway braking may be provided by the unmanned vehicle that may eliminate side-to-side oscillations of the unmanned vehicle and of connected vehicles or units. It should be appreciated that the unmanned vehicle may be configured to slow down when heavy acceleration and heavy crosswinds are experienced. The unmanned vehicle may be configured to provide at least less than one bicycle's length between other vehicles on the road or between connected vehicles or units. The unmanned vehicle may provide a tongue weight sensor that may detect when front and back loading of a trailer occurs and may slow the unmanned vehicle and connected vehicles or units and notify the driver to prevent instability. It should be appreciated that if wheels become flat, the unmanned vehicle may automatically begin to brake and stop in some embodiments of the present disclosure.

In embodiments of the present disclosure, the unmanned vehicle may be utilized for commercial applications. The unmanned vehicle may be of the size such that it may be capable of pulling a semitrailer. In some embodiments of the present disclosure, a transportation network, similar to Uber® or another transportation network service, may be used to pick up the unmanned vehicle and trailer from a drop-off location for the semi-trailer and transport it to a highway or desired road. At a highway speed or at an appropriate or desired speed limit, the unmanned vehicle may be transferred to another semitrailer or a semi-truck, and they may platoon. At the drop-off location, the unmanned vehicle may be transferred to a local pilot who may transfer the unmanned vehicle and/or the semi-trailer to a warehouse.

In additional embodiments of the present disclosure, the unmanned vehicle may be powered by a fuel cell power plant. It should be appreciated that the unmanned vehicle may be powered by the fuel cell power plant instead of being powered by an engine in some embodiments of the present disclosure. It should further be appreciated that the unmanned vehicle may be powered by other power sources without departing from the present disclosure.

Embodiments of the present disclosure may provide an unmanned and self-powered vehicle, as shown and described herein.

Other embodiments of the present disclosure may provide an unmanned and self-powered vehicle configured to follow a conventional vehicle and tow a trailer, haul a load, or recharge a pilot vehicle, as shown and described herein.

Further embodiments of the present disclosure may provide a smart trailer including self-powered axles, as shown and described herein.

Other embodiments of the present disclosure may provide a smart trailer controller, as shown and described herein.

The system and techniques as described and illustrated herein concern a number of unique and inventive aspects. Some, but by no means all, of these unique aspects are summarized below.

Aspect 1 generally concerns a system that includes a TOAD which is an unmanned self-powered vehicle with wheels to haul a trailer and follow a pilot vehicle.

Aspect 2 generally concerns the system of aspect 1 in which the TOAD is semi-autonomously controlled.

Aspect 3 generally concerns the system of aspect 1 in which the pilot vehicle is human controlled.

Aspect 4 generally concerns the system of aspect 1 in which the TOAD has a greater towing capacity than the pilot vehicle.

Aspect 5 generally concerns the system of aspect 1 in which the TOAD has a tow hitch where the trailer is coupled to the TOAD.

Aspect 6 generally concerns the system of aspect 1 in which the TOAD has a braking system that is independent from the pilot vehicle.

Aspect 7 generally concerns the system of aspect 6 in which the braking system includes a regenerative braking system for the TOAD and/or the trailer.

Aspect 8 generally concerns the system of aspect 1 in which the TOAD has a powertrain that is independent from the pilot vehicle.

Aspect 9 generally concerns the system of aspect 8 in which the powertrain includes an internal combustion engine.

Aspect 10 generally concerns the system of aspect 8 in which the powertrain includes a hybrid powertrain with an electric motor.

Aspect 11 generally concerns the system of aspect 8 in which the powertrain includes an electric powertrain.

Aspect 12 generally concerns the system of aspect 1 in which the TOAD has a control system that is independent from the pilot vehicle.

Aspect 13 generally concerns the system of aspect 1 in which the TOAD and pilot vehicle communicate via a communication system.

Aspect 14 generally concerns the system of aspect 13 in which the communication system includes a wireless communication system.

Aspect 15 generally concerns the system of aspect 14 in which the wireless communication system includes a Light Fidelity (LiFi) system.

Aspect 16 generally concerns the system of aspect 1 in which the trailer is mechanically coupled to the TOAD.

Aspect 17 generally concerns the system of aspect 1 in which the pilot vehicle is positioned in front of the TOAD.

Aspect 18 generally concerns the system of aspect 17 in which the pilot vehicle is configured to derate performance to match the performance of the TOAD.

Aspect 19 generally concerns the system of aspect 1 in which the wheels of the TOAD have a shorter wheel base length than the pilot vehicle.

Aspect 20 generally concerns the system of aspect 1 in which the TOAD includes a tow hitch where the trailer is coupled to the TOAD.

Aspect 21 generally concerns the system of aspect 20 in which the tow hitch includes a receiver type tow hitch.

Aspect 22 generally concerns the system of aspect 20 in which the tow hitch includes a fifth-wheel coupling.

Aspect 23 generally concerns the system of aspect 20 in which the tow hitch is positioned at or between front and rear wheels of the TOAD.

Aspect 24 generally concerns the system of aspect 20 in which the tow hitch is behind the rear wheels of the TOAD that are powered by electric motors.

Aspect 25 generally concerns the system of aspect 20 in which the tow hitch is retractable relative to the TOAD.

Aspect 26 generally concerns the system of aspect 1 in which the wheels of the TOAD are independently steerable relative to one another.

Aspect 27 generally concerns the system of aspect 1 in which the wheels of the TOAD have independent braking to provide tighter turning.

Aspect 28 generally concerns the system of aspect 1 in which the wheels of the TOAD have independent drives to provide tighter turning.

Aspect 29 generally concerns the system of aspect 28 in which the wheels each include an electric motor.

Aspect 30 generally concerns the system of aspect 28 in which the TOAD has front wheel steering and rear wheel drives compensate for front wheel lift.

Aspect 31 generally concerns the system of aspect 1 in which the TOAD is configured to be remotely operated by a remote controller.

Aspect 32 generally concerns the system of aspect 31 in which the TOAD is configured to operate in a speed or distance mode at low speeds.

Aspect 33 generally concerns the system of aspect 1 in which the TOAD has one or more power couplings for the pilot vehicle and trailer.

Aspect 34 generally concerns the system of aspect 33 in which the power couplings are configured to power an electric axle in the trailer that does not have a battery.

Aspect 35 generally concerns the system of aspect 1 in which the TOAD is configured to mechanically couple to the pilot vehicle.

Aspect 36 generally concerns the system of aspect 35 in which the TOAD includes a drawbar that mechanically couples the TOAD to the pilot vehicle.

Aspect 37 generally concerns the system of aspect 36 in which the TOAD is configured to control steering of the TOAD based on movement of the drawbar.

Aspect 38 generally concerns the system of aspect 36 in which the TOAD is configured to control braking of the TOAD based on force on the drawbar.

Aspect 39 generally concerns the system of aspect 1 in which the TOAD is unattached to the pilot vehicle and is configured to maintain a distance range from the pilot vehicle.

Aspect 40 generally concerns the system of aspect 39 in which the distance range is at most 1 car length.

Aspect 41 generally concerns the system of aspect 40 in which the TOAD has a control subsystem with approximately a 1 kHz bandwidth or at least a 1 kHz bandwidth.

Aspect 42 generally concerns the system of aspect 41 in which the TOAD has one or more sensors for sensing the distance to the pilot vehicle.

Aspect 43 generally concerns the system of aspect 42 in which the control subsystem includes an optical imaging system to sense the distance at least every 1 millisecond.

Aspect 44 generally concerns the system of aspect 43 in which the one or more optical identifiers are configured to be placed on the pilot vehicle for sensing by the imaging system.

Aspect 45 generally concerns the system of aspect 41 in which the TOAD interface is configured to communicate status of the pilot vehicle to the control subsystem.

Aspect 46 generally concerns the system of aspect 45 in which the TOAD interface and the control subsystem each have a Light Fidelity (LiFi) transceiver.

Aspect 47 generally concerns the system of aspect 45 in which the TOAD interface is configured to be mounted to a tow hitch receiver of the pilot vehicle.

Aspect 48 generally concerns the system of aspect 47 in which the TOAD interface includes an impact shock absorber.

Aspect 49 generally concerns the system of aspect 45 in which the TOAD interface and the control subsystem are configured to maintain driving logs.

Aspect 50 generally concerns the system of aspect 45 in which the TOAD interface includes one or more signal interceptors to intercept signals in the pilot vehicle.

Aspect 51 generally concerns the system of aspect 50 in which the signal interceptors include an Antilock Braking System (ABS) interceptor to change braking distances.

Aspect 52 generally concerns the system of aspect 50 in which the signal interceptors include a pedal interceptor to change acceleration of the pilot vehicle.

Aspect 53 generally concerns the system of aspect 45 in which the TOAD interface is configured to communicate with a Controller Area Network (CAN) of the pilot vehicle.

Aspect 54 generally concerns the system of aspect 45 in which the TOAD interface is configured to issue an alarm when the pilot vehicle accelerates or decelerates too rapidly.

Aspect 55 generally concerns the system of aspect 45 in which the TOAD interface is configured to synchronize with the control subsystem to confirm authorized use.

Aspect 56 generally concerns the system of aspect 55 in which the TOAD is configured to follow a second preauthorized pilot vehicle while moving.

Aspect 57 generally concerns the system of aspect 45 in which the TOAD interface and the control subsystem each include an Inertial Measurement Unit (IMU).

Aspect 58 generally concerns the system of any previous aspect in which the TOAD is semi-autonomously controlled.

Aspect 59 generally concerns the system of any previous aspect in which the pilot vehicle is human controlled.

Aspect 60 generally concerns the system of any previous aspect in which the TOAD has a greater towing capacity than the pilot vehicle.

Aspect 61 generally concerns the system of any previous aspect in which the TOAD has a tow hitch where the trailer is coupled to the TOAD.

Aspect 62 generally concerns the system of any previous aspect in which the TOAD has a braking system that is independent from the pilot vehicle.

Aspect 63 generally concerns the system of any previous aspect in which the braking system includes a regenerative braking system.

Aspect 64 generally concerns the system of any previous aspect in which the TOAD has a powertrain that is independent from the pilot vehicle.

Aspect 65 generally concerns the system of any previous aspect in which the powertrain includes an internal combustion engine.

Aspect 66 generally concerns the system of any previous aspect in which the powertrain includes a hybrid powertrain with an electric motor.

Aspect 67 generally concerns the system of any previous aspect in which the powertrain includes an electric powertrain.

Aspect 68 generally concerns the system of any previous aspect in which the TOAD has a control system that is independent from the pilot vehicle.

Aspect 69 generally concerns the system of any previous aspect in which the TOAD and pilot vehicle communicate via a communication system.

Aspect 70 generally concerns the system of any previous aspect in which the communication system includes a wireless communication system.

Aspect 71 generally concerns the system of any previous aspect in which the wireless communication system includes a Light Fidelity (LiFi) system.

Aspect 72 generally concerns the system of any previous aspect in which the trailer is mechanically coupled to the TOAD.

Aspect 73 generally concerns the system of any previous aspect in which the pilot vehicle is positioned in front of the TOAD.

Aspect 74 generally concerns the system of any previous aspect in which the pilot vehicle is configured to derate performance to match the performance of the TOAD.

Aspect 75 generally concerns the system of any previous aspect in which the wheels of the TOAD have a shorter wheel base length than the pilot vehicle.

Aspect 76 generally concerns the system of any previous aspect in which the TOAD includes a tow hitch where the trailer is coupled to the TOAD.

Aspect 77 generally concerns the system of any previous aspect in which the tow hitch includes a receiver type tow hitch.

Aspect 78 generally concerns the system of any previous aspect in which the tow hitch includes a fifth-wheel coupling.

Aspect 79 generally concerns the system of any previous aspect in which the tow hitch is positioned at or between front and rear wheels of the TOAD.

Aspect 80 generally concerns the system of any previous aspect in which the tow hitch is behind the rear wheels of the TOAD that are powered by electric motors.

Aspect 81 generally concerns the system of any previous aspect in which the tow hitch is retractable relative to the TOAD.

Aspect 82 generally concerns the system of any previous aspect in which the wheels of the TOAD are independently steerable relative to one another.

Aspect 83 generally concerns the system of any previous aspect in which the wheels of the TOAD have independent braking to provide tighter turning.

Aspect 84 generally concerns the system of any previous aspect in which the wheels of the TOAD have independent drives to provide tighter turning.

Aspect 85 generally concerns the system of any previous aspect in which the wheels each include an electric motor.

Aspect 86 generally concerns the system of any previous aspect in which the TOAD has front wheel steering and rear wheel drives to compensate for front wheel lift.

Aspect 87 generally concerns the system of any previous aspect in which the TOAD is configured to be remotely operated by a remote controller.

Aspect 88 generally concerns the system of any previous aspect in which the TOAD is configured to operate in a speed or distance mode at low speeds.

Aspect 89 generally concerns the system of any previous aspect in which the TOAD has one or more power couplings for the pilot vehicle and trailer.

Aspect 90 generally concerns the system of any previous aspect in which the power couplings are configured to power an electric axle in the trailer that does not have a battery.

Aspect 91 generally concerns the system of any previous aspect in which the TOAD is configured to mechanically couple to the pilot vehicle.

Aspect 92 generally concerns the system of any previous aspect in which the TOAD includes a drawbar that mechanically couples the TOAD to the pilot vehicle.

Aspect 93 generally concerns the system of any previous aspect in which the TOAD is configured to control steering of the TOAD based on movement of the drawbar.

Aspect 94 generally concerns the system of any previous aspect in which the TOAD is configured to control braking of the TOAD based on force on the drawbar.

Aspect 95 generally concerns the system of any previous aspect in which the TOAD is unattached to the pilot vehicle and is configured to maintain a distance range from the pilot vehicle.

Aspect 96 generally concerns the system of any previous aspect in which the distance range is at most 1 car length.

Aspect 97 generally concerns the system of any previous aspect in which the TOAD has a control subsystem with at most a 1 kHz bandwidth.

Aspect 98 generally concerns the system of any previous aspect in which the TOAD has one or more sensors for sensing the distance to the pilot vehicle.

Aspect 99 generally concerns the system of any previous aspect in which the control subsystem includes an optical imaging system to sense the distance at least every 1 millisecond.

Aspect 100 generally concerns the system of any previous aspect in which the one or more optical identifiers are configured to be placed on the pilot vehicle for sensing by the imaging system.

Aspect 101 generally concerns the system of any previous aspect in which the TOAD interface is configured to communicate status of the pilot vehicle to the control subsystem.

Aspect 102 generally concerns the system of any previous aspect in which the TOAD interface and the control subsystem each have a Light Fidelity (LiFi) transceiver.

Aspect 103 generally concerns the system of any previous aspect in which the TOAD interface is configured to be mounted to a tow hitch receiver of the pilot vehicle.

Aspect 104 generally concerns the system of any previous aspect in which the TOAD interface includes an impact shock absorber.

Aspect 105 generally concerns the system of any previous aspect in which the TOAD interface and the control subsystem are configured to maintain driving logs.

Aspect 106 generally concerns the system of any previous aspect in which the TOAD interface includes one or more signal interceptors to intercept signals in the pilot vehicle.

Aspect 107 generally concerns the system of any previous aspect in which the signal interceptors include an Antilock Braking System (ABS) interceptor to change braking distances.

Aspect 108 generally concerns the system of any previous aspect in which the signal interceptors include a pedal interceptor to change acceleration of the pilot vehicle.

Aspect 109 generally concerns the system of any previous aspect in which the TOAD interface is configured to communicate with a Controller Area Network (CAN) of the pilot vehicle.

Aspect 110 generally concerns the system of any previous aspect in which the TOAD interface is configured to issue an alarm when the pilot vehicle accelerates or decelerates too rapidly.

Aspect 111 generally concerns the system of any previous aspect in which the TOAD interface is configured to synchronize with the control subsystem to confirm authorized use.

Aspect 112 generally concerns the system of any previous aspect in which the TOAD is configured to follow a second preauthorized pilot vehicle while moving.

Aspect 113 generally concerns the system of any previous aspect in which the TOAD interface and the control subsystem each include an Inertial Measurement Unit (IMU).

Aspect 114 generally concerns a method of operating the system of any previous aspect.

Further forms, objects, features, aspects, benefits, advantages, and embodiments of the present invention will become apparent from a detailed description and drawings provided herewith.

DETAILED DESCRIPTION OF SELECTED EMBODIMENTS

Figure 1:
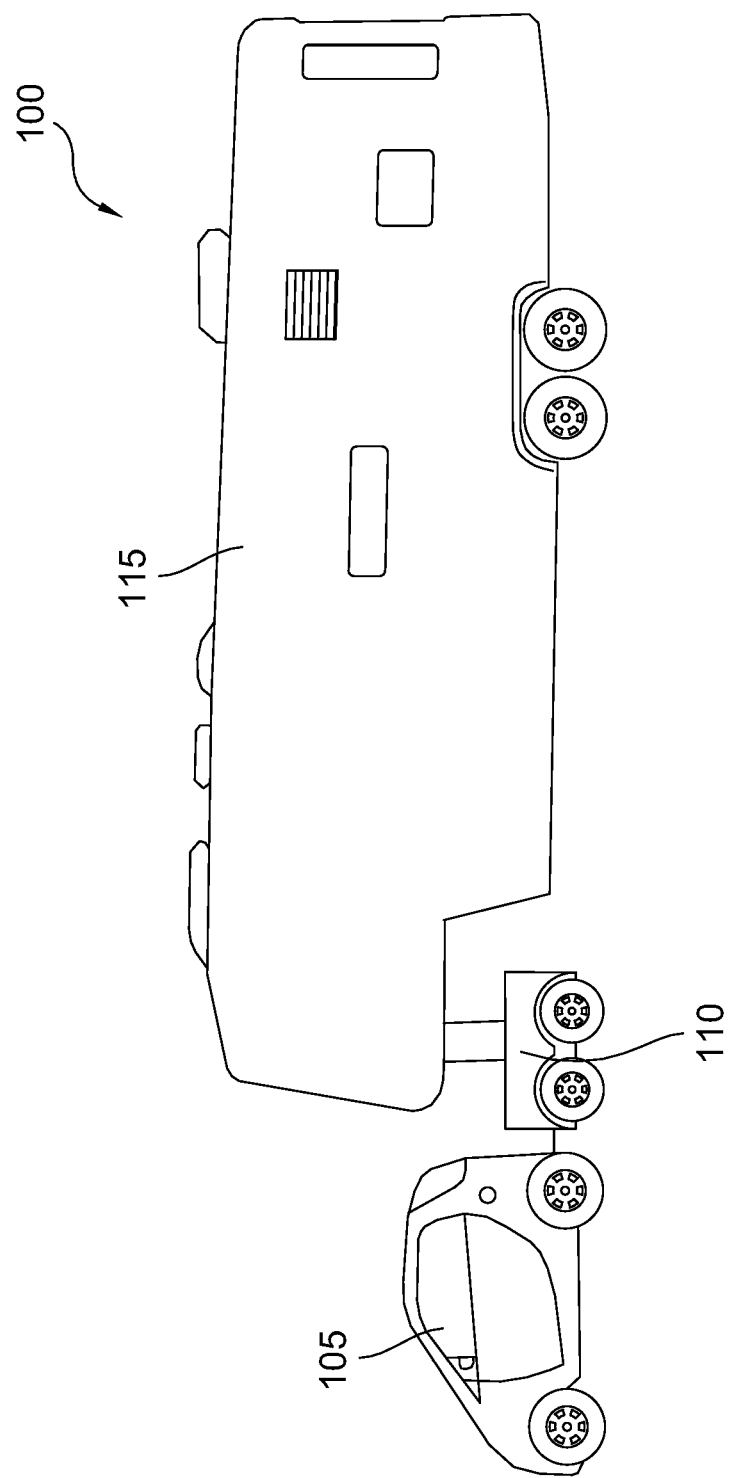
FIG. 1 is a perspective view of a trailer hauling system according to one embodiment.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

Figure 2:
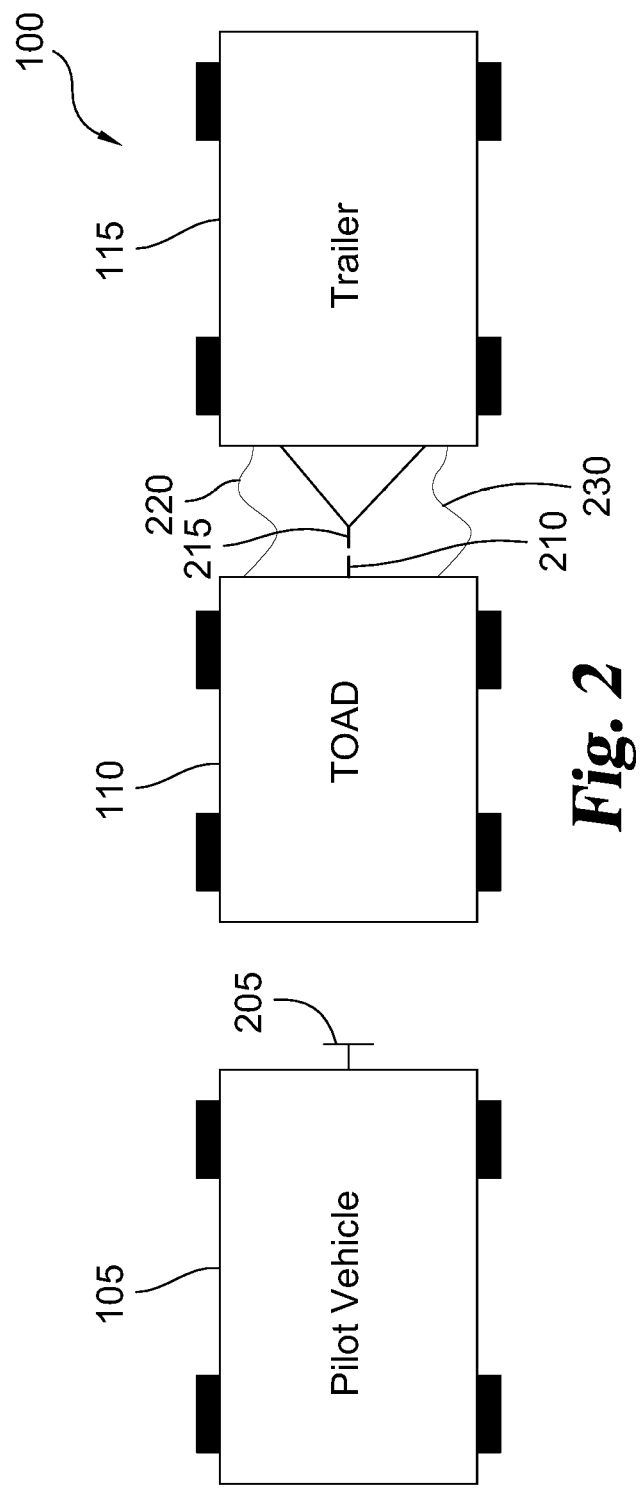
FIG. 2 is a diagrammatic view of the FIG. 1 trailer hauling system.

A trailer hauling system 100 according to one embodiment is illustrated in FIGS. 1 and 2. As shown, the trailer hauling system 100 includes a pilot vehicle 105, an unmanned self-powered vehicle or Towable Autonomous Dray ("TOAD") 110 configured to follow the pilot vehicle 105, and a trailer 115 that is towed by the TOAD 110. The pilot vehicle 105 can include for example a passenger vehicle or other vehicle that is manually driven by a human driver. In other examples, the pilot vehicle 105 can include some autonomous or semi-autonomous driving features like cruise control, lane assist, an Antilock Braking System (ABS), etc.

The TOAD 110 is inserted between the pilot vehicle 105 that is driven by a human and the trailer 115 that is towed. As will be explained in greater detail below, the TOAD 110 contains its own internal energy source and power plant that is capable of towing the trailer 115, but the TOAD 110 does require mechanical force from the pilot vehicle 105 to physically pull or tow the trailer 115. As mentioned before, most passenger vehicles, such as Hybrid Electric Vehicles (HEVs) and Electric Vehicles (EVs), lack the proper power or towing capacity to tow trailers 115. The TOAD 110 is designed to provide the towing capacity to tow trailers 115 even when the pilot vehicle 105 lacks the appropriate towing capacity. The TOAD 110 is semi-autonomous in that the TOAD 110 is able to automatically (i.e., without manual assistance by a human) adjust speed, brake, and steer based on the movement of the pilot vehicle 105, but the TOAD 110 alone is unable to move or navigate itself.

In one particular form, the TOAD 110 is designed to assist in the towing of light duty trailers (i.e., trailers weighing no more than 24,000 pounds) such as campers. To provide the towing power, the trailer hauling system 100 has an engine or electric motor and an energy source (e.g., fuel tank, battery, etc.) in the TOAD 110 that is separate from the pilot vehicle 105. Again, the TOAD 110 is configured to follow the pilot vehicle 105 such as a passenger car. In the illustrated example, the pilot vehicle 105 is not physically or mechanically connected to the TOAD 110, such that the TOAD 110 alone tows the trailer 115, but the pilot vehicle 105 and TOAD 110 are virtually coupled such that the TOAD 110 automatically follows the pilot vehicle 105. However, as will be explained with respect to other embodiments, the pilot vehicle 105 and TOAD 110 can be mechanically coupled, but in such instances, the pilot vehicle 105 provides no or insignificant pulling force to tow the trailer 115. It is envisioned that in other examples the pilot vehicle 105 may have sufficient towing capacity (e.g., is a pickup truck) to tow the trailer 115, but the driver chooses to use the TOAD 110 to minimize wear on the pilot vehicle 105 and/or provide greater flexibility. For instance, in one use case, the TOAD 110 is used to tow the trailer 115 in the form of a camper to a campground by following the pilot vehicle 105 in the form of a pickup truck, and once at the campground, the pilot vehicle 105 is quickly disconnected from the TOAD 110 and trailer 115 by virtually disconnecting from the TOAD 110.

The TOAD 110 acts as a dedicated trailer hauling machine that follows a generally conventional pilot vehicle 105. To provide a compact profile, reduce the overall tow weight of the trailer hauling system 100, and reduce cost, the TOAD 110 eliminates a number of features found in conventional as well as in fully autonomous vehicles. While the TOAD 110 for example includes a braking system, a chassis, a steering system, a powertrain, and wheels, the TOAD 110 lacks a driver compartment or cabin, a steering wheel, an environmental control system (e.g., a heater), windshields, mirrors, manual throttle/brake controls (e.g., accelerator and brake pedals), and other components commonly found in passenger vehicles. This allows the TOAD 110 to have a compact design which in turn allows the TOAD 110 to be readily positioned at a more optimal position relative to the trailer 115. For example, most states have vehicle maximum length rules (e.g., 65 feet). The short or more compact TOAD 110 allows the trailer 115 to be longer or for the TOAD 110 to pull multiple trailers 115 (e.g., dual or triple trailers). For instance, one or more TOADs 110 can be configured to pull at the same time a trailer pulling a flatbed trailer with All Terrain Vehicles (ATVs) which in turn pulls a boat trailer behind a single pilot vehicle 105. The shorter wheelbase of the TOAD 110 decreases the turning radius. This low profile also conserves fuel or electric power by minimizing wind resistance. With no driver cabin or interior, the overall cost of the TOAD 110 can be less, and the TOAD 110 can be more suitable for rental fleets because the rental operator does not need to clean up spills in the interior. An automatic car wash can be used to simply clean the TOAD 110.

Without a significant physical connection between the pilot vehicle 105 and TOAD 110, the driver of the pilot vehicle 105 can more comfortably drive the pilot vehicle 105 without the weight of the trailer 115 impacting or changing the drive characteristics of the pilot vehicle 105. Pilot vehicles 105 that could not normally tow the trailer 115 are now able to tow the trailer 115 via the TOAD 110. Once more, the TOAD 110 has semi-autonomous capabilities and not fully autonomous capabilities. The TOAD 110 is designed to control the braking, direction, and speed of both the TOAD 110 and trailer 115 so as to follow the pilot vehicle 105 at a safe distance. For instance, the TOAD 110 in one form is designed to maintain less than a car (or motorcycle) length distance between the pilot vehicle 105 and TOAD 110 (e.g., less than 2 meters) so no other vehicle is able to move in between the pilot vehicle 105 and TOAD 110.

By lacking fully autonomous navigation capabilities, the TOAD 110 is incapable of travelling any significant distance without the aid of a human being to direct movement of the TOAD 110 and trailer 115. For example, the TOAD 110 does not have a Guidance, Navigation, and Control (GNC) System and sensor systems, such as LIDAR, commonly found on fully autonomous systems. This counterintuitive approach of not having the TOAD 110 being fully autonomous addresses a number of issues, not only from a technical perspective but from a legal/political perspective. The TOAD 110 can be less expensive than a fully autonomous system because the TOAD 110 lacks expensive GNC and LIDAR systems. Moreover, the reliability of the trailer hauling system 100 can likewise be enhanced. The trailer hauling system 100 can be more quickly adopted because a human is still in control.

Looking at FIG. 2, the pilot vehicle 105 includes a TOAD interface 205 that guides and controls the TOAD 110. Generally speaking, the TOAD 110 is able to follow and maintain a safe distance with the pilot vehicle 105 via the TOAD interface 205. The TOAD 110 is mechanically coupled to the trailer 115 so that the TOAD 110 is able to tow the trailer 115. As can be seen, the TOAD 110 has a TOAD tow hitch 210, and the trailer 115 has a trailer tow coupler 215 that is mechanically coupled to the TOAD tow hitch 210 of the TOAD 110. Both the TOAD tow hitch 210 and the trailer tow coupler 215 have sufficient strength to handle all of the towing demands of the trailer 115. As can be seen, the TOAD 110 controls and communicates with the trailer 115 via a trailer harness 220. In one form, the trailer harness 220 includes a 4-wire or 7-wire cable that is commonly used for trailers, but the trailer harness 220 can include other types of wire harnesses. In another example, the TOAD 110 and trailer 115 can be operatively connected together without the trailer tow coupler 215 such as through a wireless type connection. The TOAD 110 is able to provide electrical and/or hydraulic power to the trailer 115 via a trailer charge umbilical 230 (e.g., when the trailer 115 includes an EV or HEV type system or other power requirements).

Figure 4:
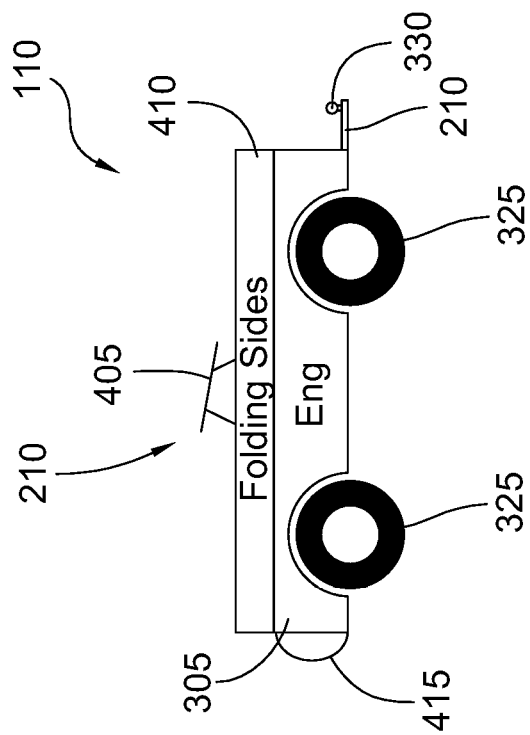
FIG. 4 is a side view of the FIG. 3 TOAD.
Figure 3:
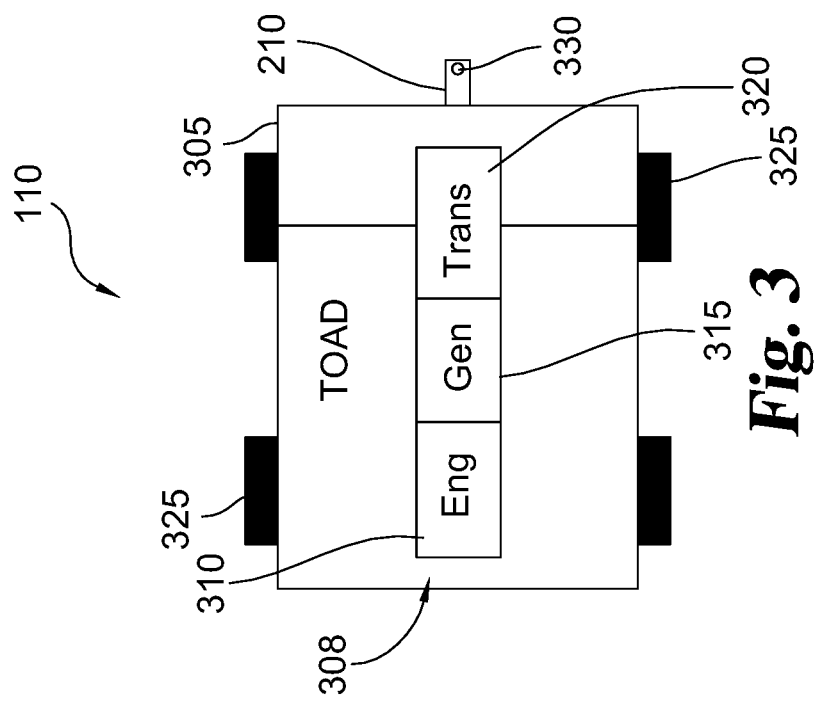
FIG. 3 is a diagrammatic view of a Towable Autonomous Dray ("TOAD") that can be used in the FIG. 1 trailer hauling system.

Referring to FIGS. 3 and 4, the TOAD 110 includes a body 305 and a powertrain system 308 configured to move the TOAD 110 independent of the pilot vehicle 105. Again, the TOAD 110 is self-powered through the powertrain system 308. The powertrain system 308 in the illustrated example includes an engine 310, a generator 315, and a transmission 320. In one form, the engine 310 of the powertrain system 308 includes a conventional internal combustion engine system (e.g., gasoline or diesel powered). In one particular example, the engine 310 includes a pickup engine such as for example a Cummins® 6.7 L diesel engine. The powertrain system 308 in this form can include other components such as a fuel tank, battery, fuel pump, electrical controls, and other components found in conventional drivetrains like those for pickups or other trucks. The engine 310 is connected to the generator 315 so as to drive the generator 315. The generator 315 in one form is configured to provide electrical power to the TOAD 110 as well as the trailer 115, if so required. In one variation, the generator 315 can also provide electrical power to the pilot vehicle 105 to recharge or otherwise provide power to the pilot vehicle 105. In one form, the generator 315 includes an alternator, and in other variations, the generator 315 can include other types of generators and/or motors like electrical machines (eMachines) found in HEVs. In one specific example, the generator 315 is an approximately a 5 kilowatt (kW) alternator on the engine 310, and the power from the generator 315 passes through an inverter to charge the pilot vehicle 105 or power trailer axles on the trailer 115. In this example, the 5 kW generator is typically a heavy duty alternator provided with stock diesel engines. In another example, a larger EV generator (e.g., 100 kW) can be used to power the trailer 115 and/or charge the pilot vehicle 105. The transmission 320 in one example includes an automatic transmission, and in one particular embodiment, the transmission 320 includes an electronically controlled automatic transmission.

As shown, the TOAD 110 includes one or more wheels 325. In the illustrated example, the TOAD 110 includes four wheels 325 to enhance traction as well as load balancing for the trailer 115, but in other examples, the TOAD 110 can include more or less wheels 325 than is shown. The powertrain system 308 in the shown example drives the rear wheels 325, but as will be shown in subsequent drawings, other wheels 325 and wheel combinations can be driven by the powertrain system 308.

As noted before, the TOAD tow hitch 210 is used to mechanically couple the TOAD 110 to the trailer 115 for towing purposes. The TOAD tow hitch 210 in the depicted example includes a tow ball 330 but other types of hitches can be used. For example, as shown in FIG. 4, the TOAD tow hitch 210 further includes a fifth-wheel coupling 405. The fifth-wheel coupling 405 is typically designed to tow heavier loads as compared to the tow ball 330. As can be seen, the fifth-wheel coupling 405 is positioned on the body 305 between the front and rear axles of the wheels 325 to enhance traction and control of the trailer 115. The TOAD 110 further has one or more folding sides 410. The folding sides 410 are able to fold down to further facilitate access to the fifth-wheel coupling 405. The folding sides 410 can be folded up to carry or contain cargo. The TOAD 110 further includes at least one bumper 415 configured to absorb energy from an impact with the pilot vehicle 105 or other object. The bumper 415 typically faces the pilot vehicle 105, but the bumpers 415 can be positioned elsewhere on the body 305 in other examples. As will be explained further below, the bumper 415 can include one or more sensors for sensing the relative position of the pilot vehicle 105 and/or other objects.

Other examples of the TOAD 110 that can be used in the trailer hauling system 100 will now be described below with reference to FIGS. 5-10. As can be seen, the TOADs 110 in these illustrated examples share a number of features in common with the TOAD 110 shown in FIGS. 3 and 4. Like in FIG. 4, each of the TOADs 110 in FIGS. 5-10 include the TOAD tow hitch 210 such as the tow ball 330 and the fifth-wheel coupling 405. For the sake of brevity and clarity, these common features and functions will not be discussed in detail again below, so please refer to the previous discussion. As will be explained in greater detail below, the TOADs 110 in FIGS. 3-10 address a number of issues associated with towing via pickup trucks and similar vehicles.

Figure 5:
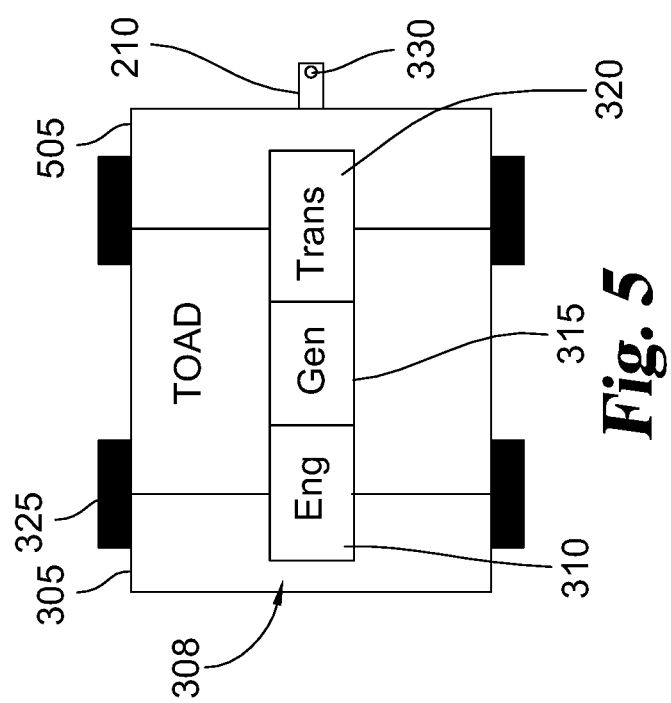
FIG. 5 is a diagrammatic view of a non-hybrid, four wheel drive TOAD that can be used in the FIG. 1 trailer hauling system.

FIG. 5 for example shows a TOAD 505 with the powertrain system 308 that includes the engine 310, generator 315, and transmission 320 of the type described above. In this example, the TOAD 505 is a non-hybrid four wheel drive (4WD) type vehicle in which the powertrain system 308 supplies power to all four wheels 325. In one example, all four wheels are steerable by the TOAD 505, and in other examples, only two wheels 325 are steerable.

Figure 6:
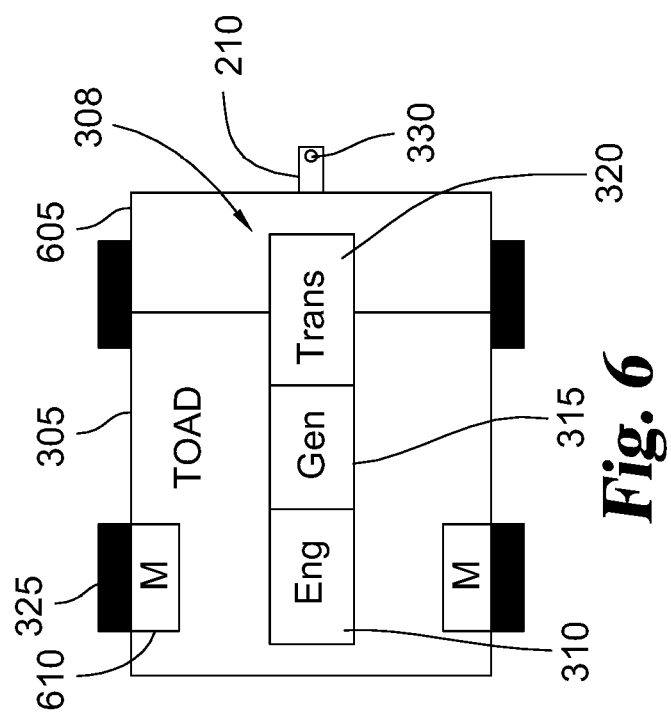
FIG. 6 is a diagrammatic view of a front drive, hybrid TOAD that can be used in the FIG. 1 trailer hauling system.

FIG. 6 depicts a TOAD 605 with a basic hybrid or HEV design in which the engine 310 of the powertrain system 308 powers the generator 315. The generator 315 supplies electrical power to one or more electric motors 610 that drive the front wheels 325. In the depicted example, the transmission 320 of the powertrain system 308 supplies mechanical power to the rear set of the wheels 325. The electric motors 610 are configured to also generate electrical power through regenerative braking, and the electric motors 610 can be used to steer the wheels 325. The electric motors 610 facilitate torque control of the individual wheels 325 which is convenient for tight turning. The hybrid or HEV systems described herein each further includes a power converter, like an inverter, and an Energy Storage System (ESS), such as batteries and/or ultracapacitors, for storing and supplying electrical energy to the electric motors 610.

Figure 7:
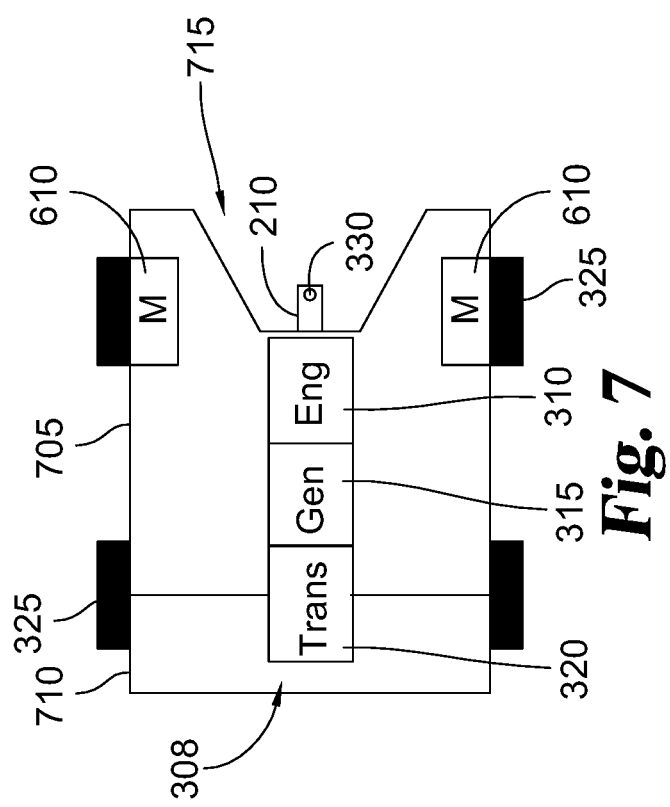
FIG. 7 is a diagrammatic view of a rear drive, hybrid TOAD that can be used in the FIG. 1 trailer hauling system.

Like in the other examples, a TOAD 705 in FIG. 7 includes the powertrain system 308 with the engine 310, generator 315, and transmission 320. The relative orientation of the engine 310 and transmission 320 are reversed so that the powertrain system 308 supplies mechanical power to the front wheels 325. The TOAD 705 has a hybrid or HEV type design in which the generator 315 and other components supply electrical power to the electric motors 610 that power the rear wheels 325. As can be seen, the TOAD 705 has a body 710 with a notch area 715 proximal to the rear wheels 325. The electric motors 610 positioned at the rear wheels 325 further allow the TOAD tow hitch 210 to move forward. The electric motors 610 and the notch area 715 allow the TOAD tow hitch 210 to align with the axles of the rear wheels 325 so as to help balance the load of the trailer 115. In the illustrated example, the TOAD tow hitch 210 includes the tow ball 330, but in other examples, the TOAD tow hitch 210 in the TOAD 705 includes the fifth-wheel coupling 405. In one form, the TOAD 705 in FIG. 7 has front wheel steering, and in other variations, the TOAD 705 in FIG. 7 has rear wheel steering.

Figure 8:
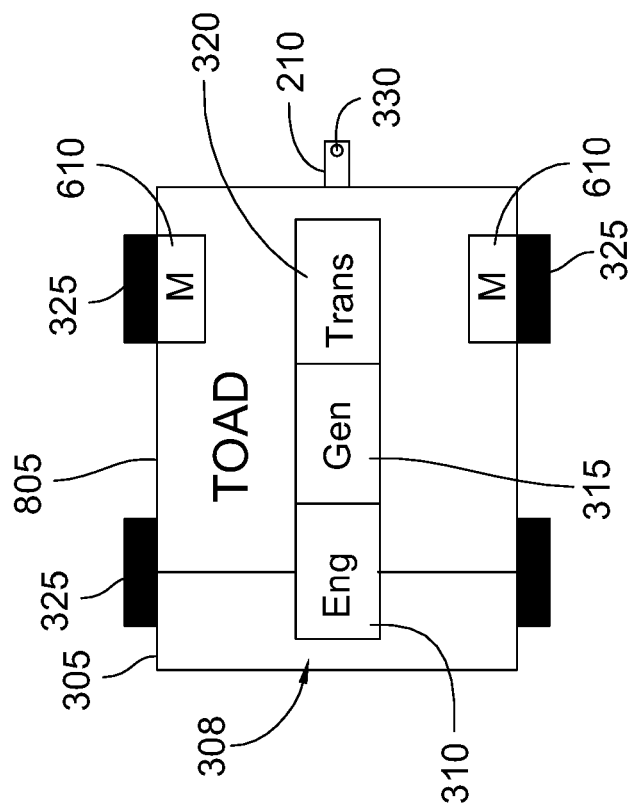
FIG. 8 is a diagrammatic view of a front drive, hybrid TOAD with an independent rear suspension that can be used in the FIG. 1 trailer hauling system.

A TOAD 805 in FIG. 8 includes the powertrain system 308 with the engine 310, generator 315, and transmission 320. The TOAD 805 is constructed in a similar fashion as the TOAD 605 in FIG. 6. However, the powertrain system 308 supplies mechanical power to the front wheels 325. Once more, the TOAD 805 has a hybrid or HEV type design in which the generator 315 and other components supply electrical power to the electric motors 610 which in this case power the rear wheels 325. In this example, the TOAD tow hitch 210 is located behind the axles of the rear wheels 325. In the illustrated example, the TOAD tow hitch 210 includes the tow ball 330, but in other examples, the TOAD tow hitch 210 in the TOAD 705 includes the fifth-wheel coupling 405. In one form, the TOAD 805 in FIG. 8 has front wheel steering, and in other variations, the TOAD 805 in FIG. 8 has rear wheel steering. In one form, the TOAD 805 in FIG. 8 has front wheel steering. The motors 610 powering the rear wheels 325 are configured to be driven independently relative to one another to augment steering and enhance stability such as when lifting of the front wheels 325 occurs due to the tow hitch 210 being located behind the rear wheels 325.

Figure 9:
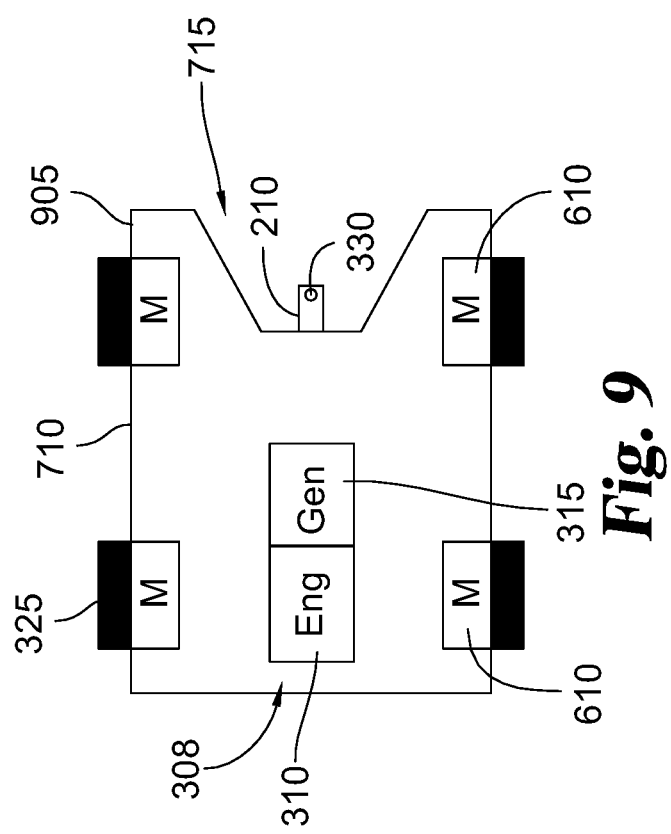
FIG. 9 is a diagrammatic view of a four motor, four wheel steering TOAD that can be used in the FIG. 1 trailer hauling system.

FIG. 9 depicts a TOAD 905 with a hybrid or HEV design in which the electric motors 610 power each of the wheels 325. In this design, the powertrain system 308 includes the engine 310 and generator 315, but the powertrain system 308 lacks the transmission 320 as the wheels 325 are powered solely by the electric motors 610. In this example, the wheels 325 are independently steerable such that the TOAD 705 has four wheel steering capabilities. The electric motors 610 further facilitate individual torque control of the wheels 325 which can help minimize slipping of the wheels 325 and is convenient for tight turning situations. The electric motors 610 in conjunction with the notch area 715 in the body 710 allow the TOAD tow hitch 210 to be moved forward in the body 710 which helps facilitate load balancing.

Figure 10:
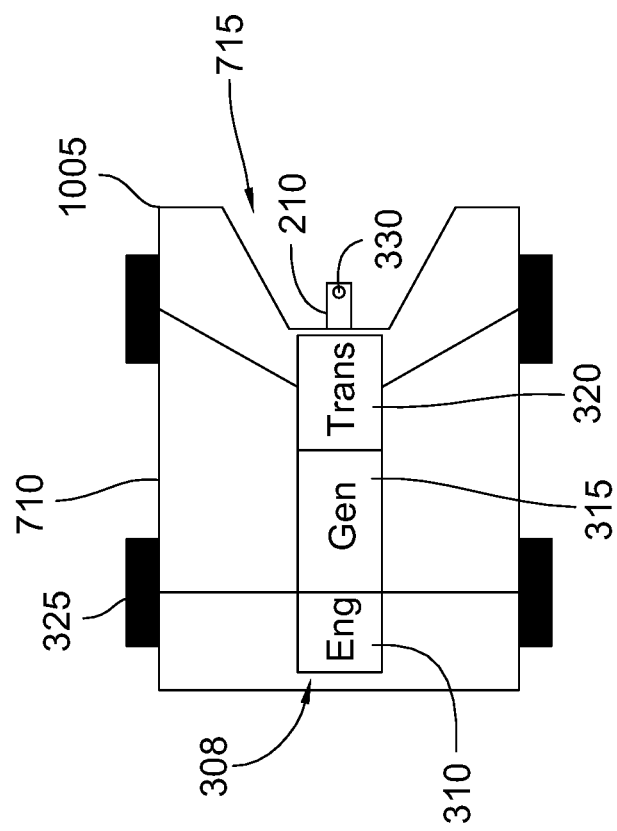
FIG. 10 is a diagrammatic view of a TOAD with an independent rear suspension and a solid front suspension that can be used in the FIG. 1 trailer hauling system.

FIG. 10 shows a TOAD 1005 with an internal combustion engine configuration in which the powertrain system 308 includes the engine 310, generator 315, and transmission 320 that supplies mechanical power to the wheels 325. As shown, the TOAD 1005 has an independent rear suspension and a solid front suspension such that the TOAD 1005 has four wheel steering capabilities. Like in the previous examples, the body 710 of the TOAD 1005 has a TOAD tow hitch 210 that is moved forward to generally align with the rear wheels 325.

The designs of the TOADs 110 illustrated in FIGS. 3-10 address several issues commonly experienced with towing via pickup trucks and similar vehicles. As compared to pickup trucks, the TOAD 110 provides increased maneuverability. Pickups are long because long wheelbases are required to keep sufficient down force on the front wheels and to make the vehicle less "twitchy" when side forces are imposed by the trailer in a cross-wind or other adverse conditions. A short wheelbase vehicle pulling a heavy trailer will tend to pitch front and back disconcertingly. On the other hand, the TOAD 110 does not need to a have a long wheel base for either passenger comfort or driver ease because the TOAD 110 is unmanned. The steering of the TOAD 110 is computer controlled. As a result, the TOAD 110 can have a relatively short wheelbase that improves maneuverability.

When a vehicle, such as a pickup truck, has front wheel steering, it is desirable to keep sufficient downforce on the front wheels at all times so that the vehicle can be properly steered. The tongue weight of a trailer, which is often 15% of total trailer weight, is applied to the hitch which then causes the front wheels of the pickup truck to lift off the ground as is detailed in Society of Automotive Engineers (SAE) Standard J2807.

As should be recognized, the TOADs 110 in the FIG. 3-10 examples address this steering wheel downforce as well as other issues. To reduce the impact of weight imbalance, the TOAD tow hitch 210 in some of the examples has been moved as far forward as possible. For example, the fifth-wheel coupling 405 in the TOAD 110 of FIG. 4 is positioned between the front wheels 325 and the rear wheels 325. In the design shown in FIGS. 7-10 the TOAD tow hitch 210 (e.g., the tow ball 330) is positioned at or in front of the centerline of the rear wheels 325. As noted before, this forward location of the TOAD tow hitch 210 increases highway stability, such as when the TOAD 110 has only front wheel steering capabilities. However, moving the TOAD tow hitch 210 forward in the TOAD 110 can sometimes reduce the maximum cornering angle of the TOAD 110 in parking situations. In this case, an active-hitch is employed where the TOAD tow hitch 210 is electrically or hydraulically extended past the back of the TOAD 110 to allow a sharper maximum trailer to TOAD angle during low speed maneuvering and then retracting into the TOAD 110 to bring the TOAD tow hitch 210 forward for highway maneuverability.

Another option for addressing this issue, which is depicted in FIGS. 7 and 9, is to have the electric motors 610 positioned at the rear wheels 325 of the TOAD 110. In this case, the electric motors 610 of the rear wheels 325 can act in concert with the front wheel steering so that even in extreme conditions where the front wheels 325 are temporarily lifted off the ground (e.g., when going over a bump while braking) directional stability is maintained. These features allow the TOAD 110 to have a very short wheelbase that is only constrained by the physical packaging of the powertrain system 308.

As noted before, the TOAD 110 is designed to typically follow the pilot vehicle 105 in most cases. However, there are certain use cases where the TOAD 110 is capable of being remotely controlled without the pilot vehicle 105. For example, it is sometimes hard to properly position a camper at a campground with the pilot vehicle 105. In warehousing environments, trailer parking around the warehouse is always a concern. In these as well as other use cases, the TOAD 110 can be operated at parking lot speeds by a remote control that is operated by an outside operator. This remote control can be done when no pilot vehicle 105 is attached (i.e., physically or virtually) with the TOAD 110. In one form, the operator remotely controls the TOAD 110 and the trailer 115 via a dedicated controller. In another form, the operator controls the TOAD 110 and trailer 115 via an app on a smart device (e.g., cellphone or tablet). In most operational conditions, the TOAD 110 operates using a "torque mode" where the torque applied to the wheels 325 is monitored. For these low speed, parking type situations, the TOAD 110 in the remote control operational mode operates in "distance mode" or "speed mode" where the travel distance and/or speed of the TOAD 110 and trailer 115 is monitored. In this distance or speed mode, the TOAD 110 applies sufficient torque to move the trailer 115 some distance regardless of whether the distance is flat, over a curb, or onto leveling blocks. This distance or speed mode eliminates the overshoot problem commonly found when climbing a vehicle over obstacles. In the hybrid examples shown in FIGS. 6-9, the quick response time and bidirectional torque of the electric motors 610 can further enhance this distance or speed operational mode when the TOAD 110 is remotely controlled.

In other examples, the TOAD 110 is connected to a smart trailer device and shares communication information from the trailer 115. One type of such smart trailer device or braking system is described in U.S. patent application Ser. No. 16/251,565, filed Jan. 18, 2019, which is hereby incorporated by reference in its entirety. This trailer information, such as a trailer door open warning, from the trailer 115 is passed along to the pilot vehicle 105. This trailer information may also be acted on independently by the TOAD 110. For example, parking sensor signals on the TOAD 110 and/or trailer 115 in one variation cause the TOAD 110 to trigger automatic braking in both the TOAD 110 and the trailer 115. As will be described further below, the communication link can be extended over Light Fidelity (LiFi) wireless communication systems to the pilot vehicle 105.

As noted before, the TOAD 110 in certain operational modes can be physically coupled to the pilot vehicle 105, and in other modes, the TOAD 110 is virtually coupled to the pilot vehicle 105 such that the TOAD 110 operates semi-autonomously. When physically coupled, the TOAD 110 is mechanically attached to the pilot vehicle 105. In this case, the physical coupling is primarily used to match speeds between the pilot vehicle 105 and the TOAD 110. The physical coupling further helps to guide the steering mechanism of the TOAD 110. Typically, there are only a few tens of pounds of tongue weight on the ball of the receiver hitch on the pilot vehicle 105. Once more, most if not all of the weight from the trailer 115 is carried by the TOAD 110. With such little weight applied to the pilot vehicle 105, there is very little impact on the steering and handling of the pilot vehicle 105.

Figure 11:
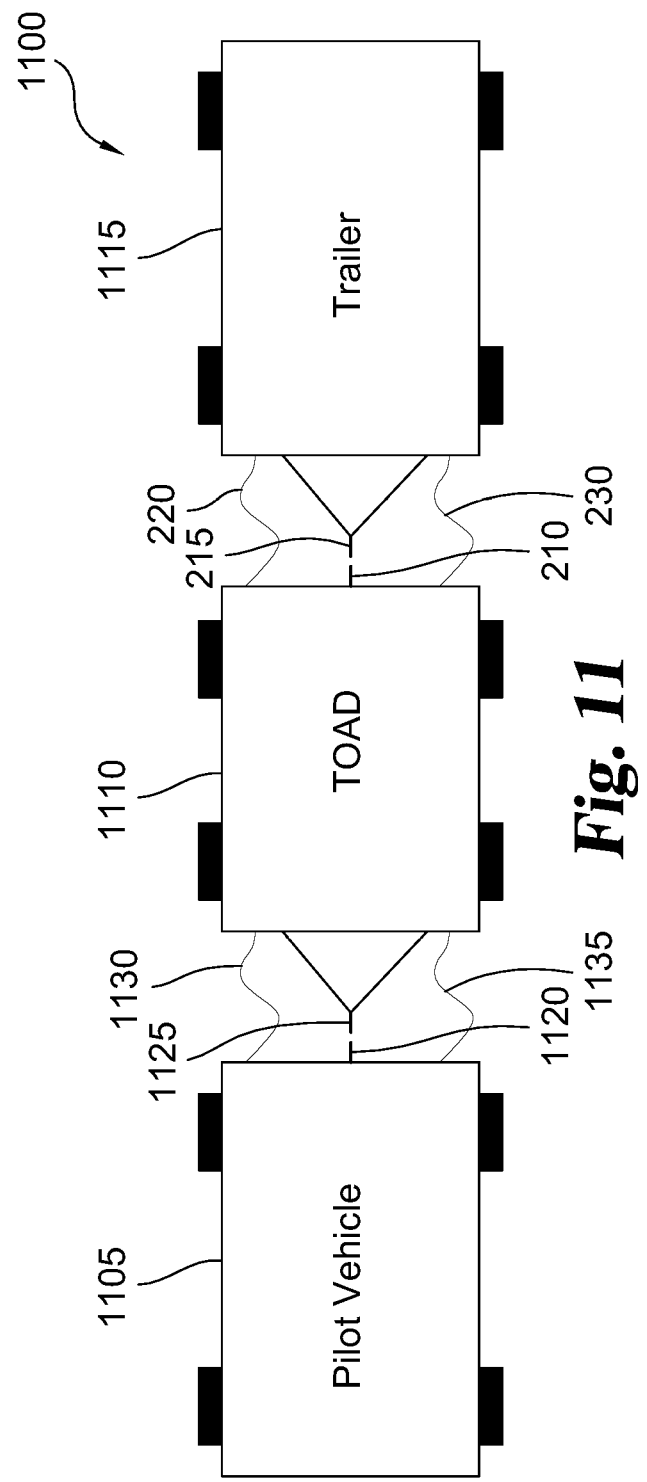
FIG. 11 is a diagrammatic view of a trailer hauling system according to another embodiment.

FIG. 11 illustrates one example of a trailer hauling system 1100 that includes a pilot vehicle 1105 physically coupled to a TOAD 1110 and a trailer 1115. As should be recognized, the pilot vehicle 1105, TOAD 1110, and trailer 1115 are constructed in a similar fashion as the ones described before. For the sake of brevity and clarity, please refer to the previous discussion of these features. As can be seen, the pilot vehicle 1105 has a vehicle tow hitch 1120, and the TOAD 1110 has a TOAD tow coupler 1125 coupled to the vehicle tow hitch 1120 of the pilot vehicle 1105. The pilot vehicle 1105 controls and communicates with the TOAD 1110 via a TOAD harness 1130. In one form, the TOAD harness 1130 includes a 4-wire or 7-wire type cable that is commonly used for trailers, but the TOAD harness 1130 can include other types of wire harnesses. In other examples, the pilot vehicle 1105 and TOAD 1110 are operatively connected together without the TOAD tow coupler 1125 such as through a wireless type connection (e.g., LiFi). The pilot vehicle 1105 is able to provide electrical and/or hydraulic power to the TOAD 1110 via a TOAD charge umbilical 1135 (e.g., when the trailer 115 includes an EV or HEV type system or other power requirements). The supplied hydraulic power can be used for braking purposes. The TOAD charge umbilical 1135 can be also used to supply power from the TOAD 1110 to the pilot vehicle 1105 such as for battery recharging purposes.

Like before, the TOAD 1110 is mechanically linked to tow the trailer 1115. The TOAD 1110 includes the TOAD tow hitch 210 (e.g., the tow ball 330 and/or fifth-wheel coupling 405) to which the trailer tow coupler 215 of the trailer 1115 is connected. Once more, the TOAD 1110 controls and communicates with the trailer 1115 via the trailer harness 220. The TOAD 1110 is able to provide electrical and/or hydraulic power to the trailer 1115 via the trailer charge umbilical 230.

Figure 12:
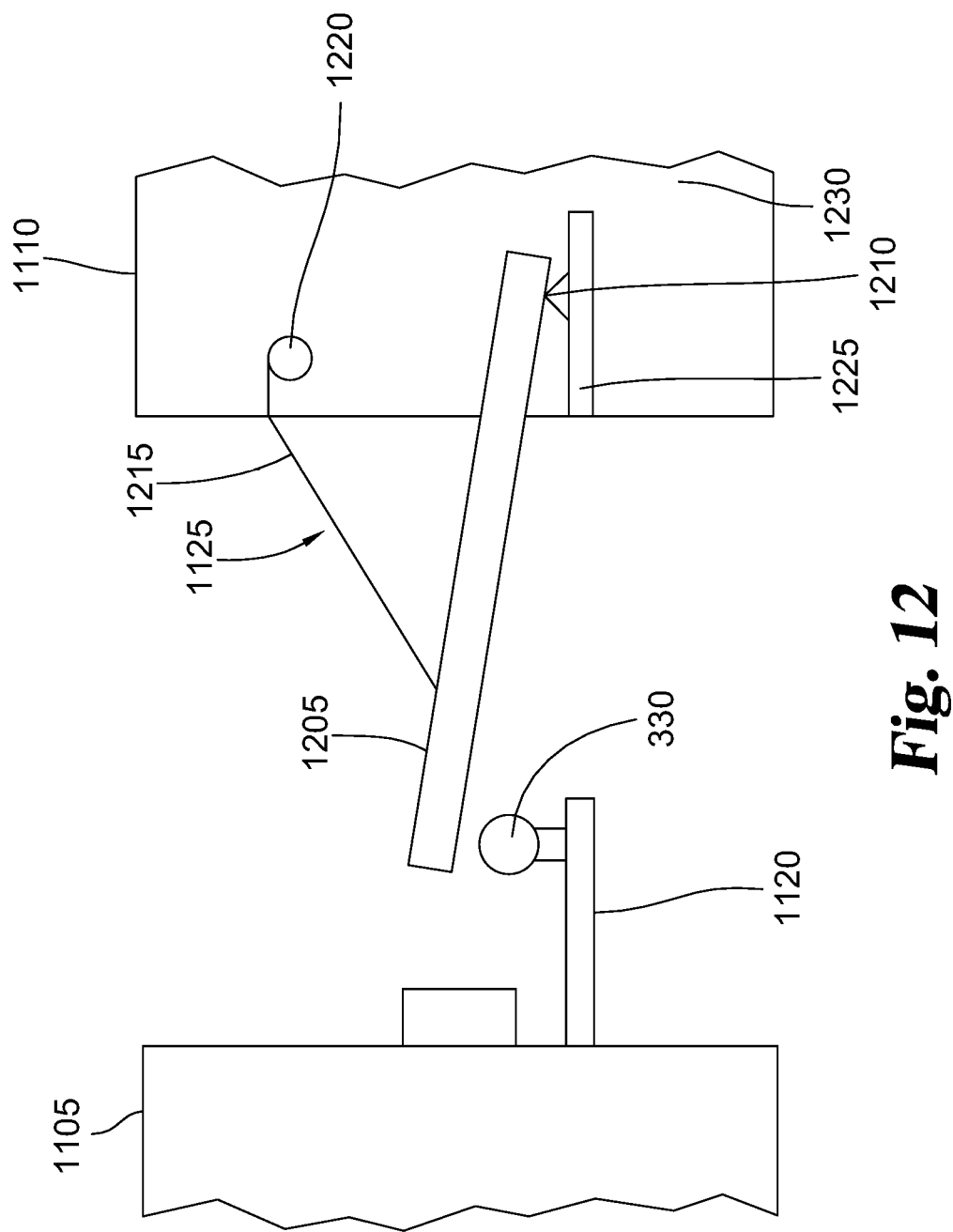
FIG. 12 is a side view of a TOAD tow coupler coupling a TOAD to a pilot vehicle of FIG. 11.

FIG. 12 shows a side view of the mechanical coupling between the pilot vehicle 1105 and the TOAD 1110. It should be recognized that some of these features can be incorporated into the mechanical coupling with the TOAD 1110 and the trailer 1115. In the illustrated example, the vehicle tow hitch 1120 includes the tow ball 330 but other types can be used. As shown, the TOAD tow coupler 1125 includes a drawbar 1205 that is pivotally connected to a pivot joint 1210. The drawbar 1205 is coupled to the tow ball 330 of the vehicle tow hitch 1120. In one form, the drawbar 1205 is made of steel. To neutralize the weight of the drawbar 1205, the drawbar 1205 is supported by a drawbar cable 1215 that is wound around a spring-biased reel 1220. The spring-biased drawbar cable 1215 is then able to support the drawbar 1205. This spring biasing of the drawbar 1205 makes connecting and disconnecting from the pilot vehicle 1105 an easy process. Under braking conditions if the pilot vehicle 1105 brakes harder than the TOAD 1110, the drawbar 1205 linkage would tend to push the pilot vehicle 1105 in a fashion similar to an ordinary trailer. Once more, the drawbar 1205 is pivotally mounted to the pivot joint 1210 that allows both vertical and lateral relative movement. The pivot joint 1210 is mounted to a joint support plate 1225 that is extendably mounted to a frame 1230 of the TOAD 1110. In one example, the joint support plate 1225 is able to extend and retract so as to extend and retract the drawbar 1205 in a telescoping manner to allow ease of coupling among other things.

In one form, the pivot joint 1210 includes a force and angle sensor to measure the force applied to the drawbar 1205 and the relative angle of the drawbar 1205 (both horizontally and vertically). Alternatively or additionally, the force on the end of the drawbar 1205 can be measured through a sensor in the spring-biased reel 1220, and the relative angle of the drawbar 1205 can be determined by measuring the length of the drawbar cable 1215 through the spring-biased reel 1220. Based on the measured force on the TOAD facing end of the drawbar 1205, the TOAD 1110 accelerates or decelerates to bring an error term of the force between the pilot vehicle 1105 and TOAD 1110 to around zero (0) or within a specified tolerance range. With the measured relative angle of the drawbar 1205, the TOAD 1110 controls the drive angle of the steerable wheels 325 of the TOAD 1110. In some cases, the TOAD 1110 employs models to smooth the response and correct the angle to prevent oscillations in speed and/or direction of the TOAD 1110. In a similar fashion, the TOAD 1110 is able to measure the acceleration and the relative position of the trailer tow coupler 215 of the trailer 1115 so as to make steering and/or braking adjustments for the trailer 1115.

Figure 13:
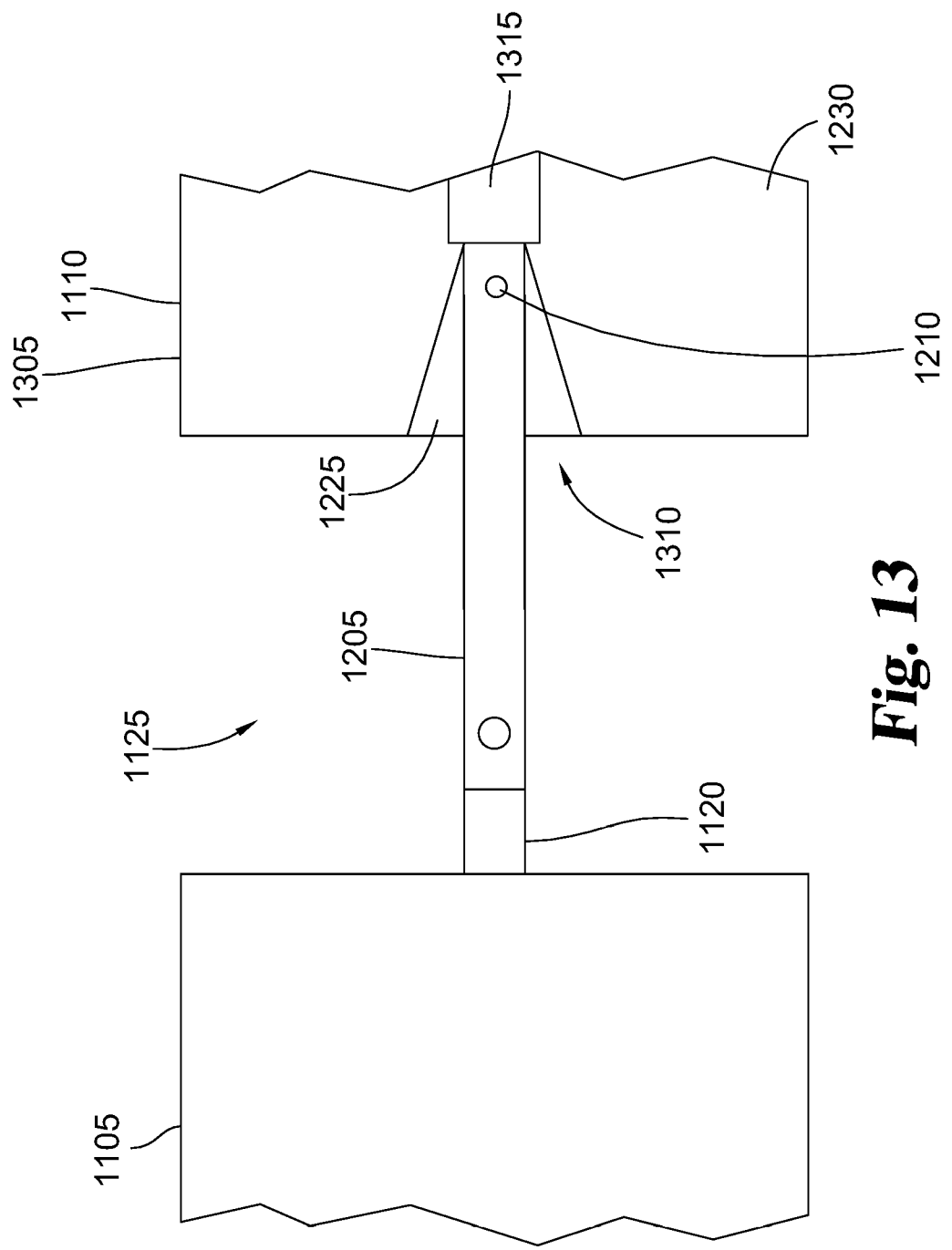
FIG. 13 is a top view of the FIG. 12 TOAD tow coupler in a retracted position.
Figure 14:
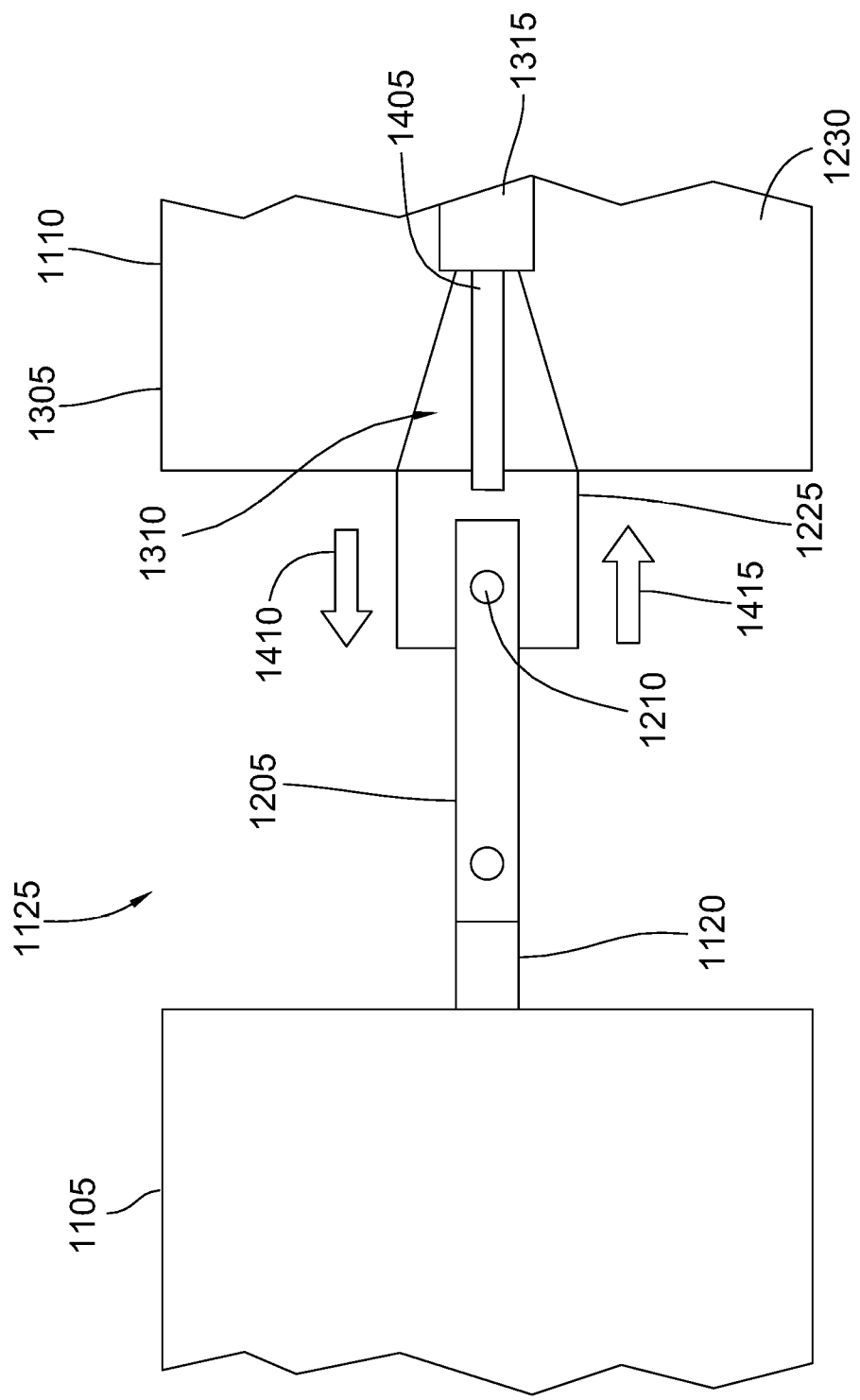
FIG. 14 is a top view of the FIG. 12 TOAD tow coupler in an extended position.

As mentioned before, the drawbar 1205 in some examples is extendable and retractable relative to the TOAD 1110 to allow ease of coupling among other things. For low or parking lot speed maneuvers, the drawbar 1205 is extended from the front of the TOAD 1110 to allow a large angle between the TOAD 1110 and the pilot vehicle 1105. FIG. 13 shows the drawbar 1205 of the TOAD 1110 at a retracted position, and FIG. 14 shows the drawbar 1205 at an extended position. Referring to FIG. 13, the TOAD 1110 includes a body 1305 mounted to the frame 1230. In a manner similar to the notch area 715 in FIGS. 7-10, the body 1305 defines a notch area 1310 that is V-shaped to facilitate relative pivoting of the drawbar 1205 during turns. With the drawbar 1205 in the retracted position, the drawbar 1205 in one form can be positioned closer to the centerline of the front wheels 325 to enhance handling such as during high speed travel (e.g., along highways). Under heavy braking or deceleration conditions, the drawbar 1205 may move laterally and/or vertically which in turn can undesirably push the pilot vehicle 1105. When the drawbar 1205 is in the retracted position, the drawbar 1205 is constrained so as to inhibit this lateral and vertical movement of drawbar 1205 so as to reduce pushing of the pilot vehicle 1105. The TOAD 1110 further includes an actuator 1315 that is coupled to the joint support plate 1225 so as to extend and retract the drawbar 1205 relative to the body 1305 of the TOAD 1110. In one form, the actuator 1315 includes a linear actuator such as an electric, hydraulic, and/or pneumatic type actuator.

Turning to FIG. 14, the actuator 1315 includes an actuator rod 1405 that is secured to the joint support plate 1225. The actuator 1315 extends the actuator rod 1405 in an extension direction 1410 to extend the drawbar 1205, and the actuator 1315 retracts the actuator rod 1405 to move the drawbar 1205 in a retraction direction 1415. Again, the drawbar 1205 is extended in the extension direction 1410 from the front of the TOAD 1110 to allow a larger turning angle between the TOAD 1110 and the pilot vehicle 1105 such as for low speed turning or parking maneuvers. Once the TOAD 1110 is sensed at being a higher (i.e., non-parking) speed, the TOAD 1110 via the actuator 1315 retracts the drawbar 1205 in the retraction direction 1415 to the retracted position shown in FIG. 13. The notch area 1310 in the body 1305 acts as guides for the drawbar 1205 so as to constrain the maximum angle between the drawbar 1205 and the TOAD 1110 such that under extreme braking the TOAD 1110 will not swing to the side to cause a collision. Additional active constraints on the angle of the drawbar 1205 can be applied. For example, friction brake clamping of the drawbar 1205 in place and/or hydraulic (or electrical) actuator tightening against the sides of the drawbar 1205 can be used to clamp the drawbar 1205 in place. It should be recognized that the same extension and retraction mechanism can be used for the TOAD tow hitch 210 and trailer tow coupler 215 between the TOAD 1110 and the trailer 1115. For example, the same mechanism can be used to extend and retract the TOAD tow hitch 210 in the TOAD 110 shown in FIGS. 7-10.

Figure 15:
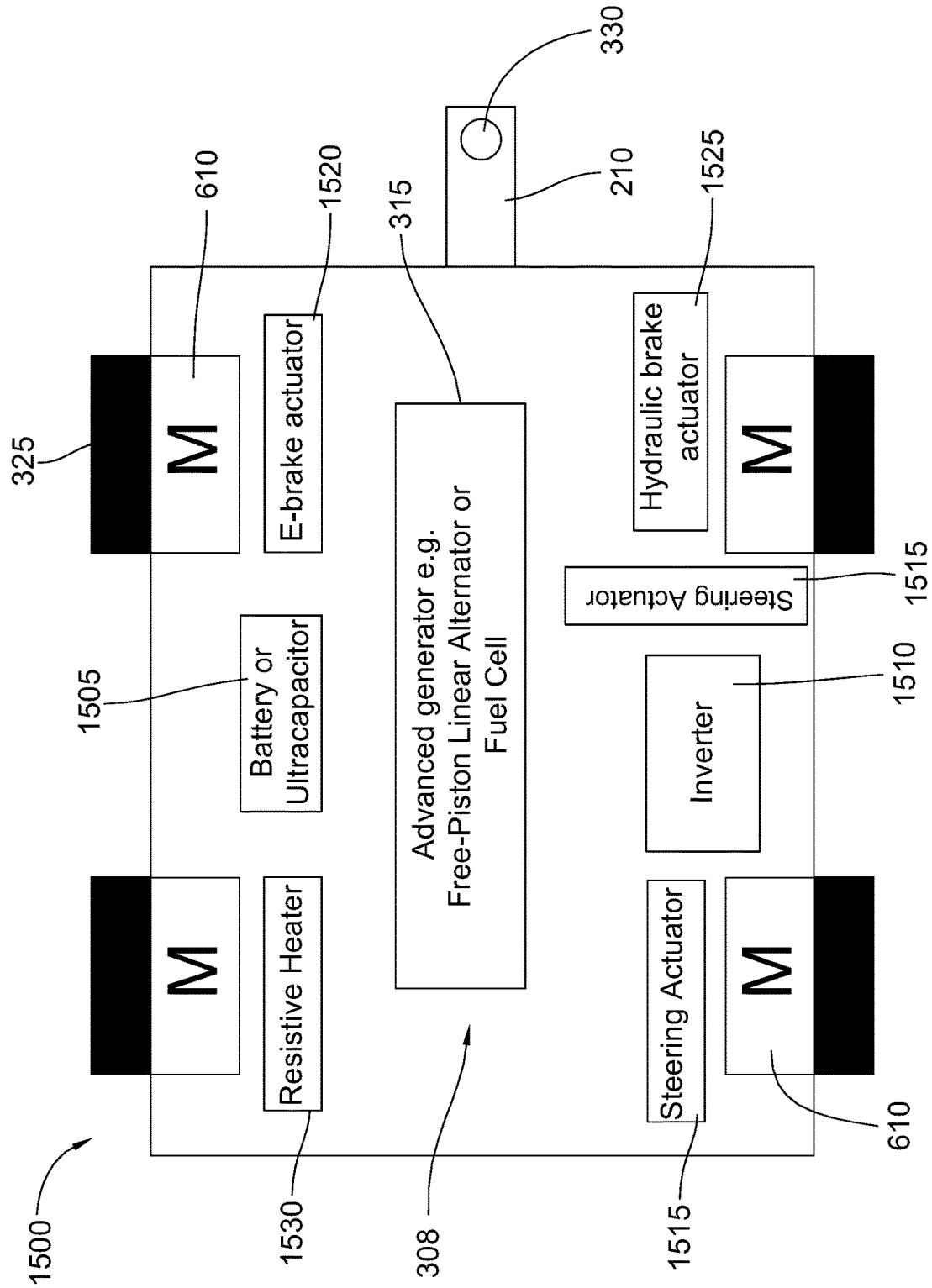
FIG. 15 is a diagrammatic view of motive components of a TOAD according to a further embodiment.

Once more, the pilot vehicle 105 can be also virtually connected or associated with the TOAD 110 without any mechanical connection. A TOAD 1500 according to another example that is configured for this semi-autonomous virtual connection will now be described with reference to FIGS. 15 and 16. The powertrain system 308 in the TOAD 1500 depicted in FIG. 15 uses an Electric Vehicle (EV) type power plant in which electric power moves the TOAD 1500, but in other examples, the powertrain system 308 can include a Hybrid Electric Vehicle (HEV) or internal combustion engine type power plants. As shown in FIG. 15, the TOAD 1500 includes an ESS 1505, such as a battery or ultracapacitor and a power converter 1510 like an inverter that is used to convert Direct Current (DC) electrical power from the ESS 1505 to Alternating Current (AC) electrical power from the generator 315 and/or the electric motors 610, and vice-versa. The generator 315 can for example include a free-piston linear actuator or a fuel cell to generate electrical power.

Each of the wheels 325 is driven by one of the electric motors 610 so as to accurately control torque. In other words, the TOAD 1500 is a four wheel drive (4WD) type vehicle. Each of the wheels 325 are independently steerable in one example. As shown, each wheel 325 or pair of wheels 325 (e.g., the front or back pair of wheels) has one or more steering actuators 1515 that steer the wheels 325. To slow down or stop the wheels 325 (i.e., control braking), the TOAD 1500 further includes at least one electric brake actuator ("E-brake") 1520 and at least one hydraulic brake actuator 1525. To conserve energy, the TOAD 1500 can utilize regenerative braking. The TOAD 1500 can include a resistive heater 1530 to further control braking.

Figure 16:
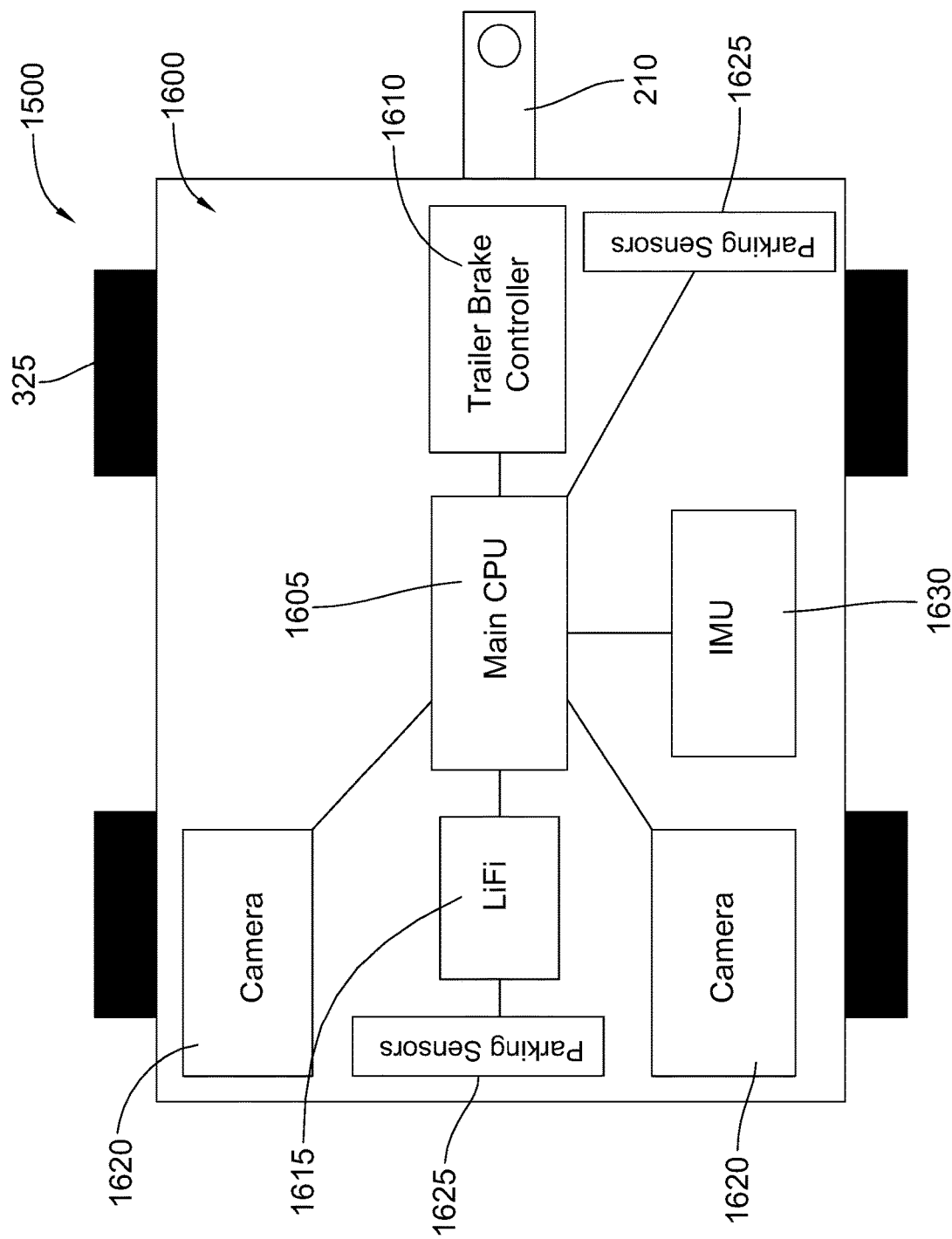
FIG. 16 is a diagrammatic view of control components of the FIG. 15 TOAD.

FIG. 16 shows the main components of a control subsystem 1600 used in the TOAD 1500. During development of the TOAD 1500, a number of unexpected or counterintuitive features were discovered. In order to operate in this virtual or semi-autonomous mode, the TOAD 1500 generally needs to maintain a one car length or less distance between the pilot vehicle 105 and the TOAD 1500. This relatively short distance normally prevents another car or other vehicle from getting in between the pilot vehicle 105 and the TOAD 1500. Typically, the TOAD 1500 is designed to maintain a buffer distance range of between 5 to 15 feet with the pilot vehicle 105 depending on speed. For example, when travelling around 80 miles per hour (mph), this buffer distance is at most 10 feet. This buffer distance represents an 85 millisecond (ms) reaction or buffer time between the pilot vehicle 105 and the TOAD 1500. To handle this relative short reaction time, the TOAD 1500 utilizes a very high-speed sensing and feedback control subsystem 1600. In order to keep the relative speeds between the pilot vehicle 105 and the TOAD 1500, it was discovered that the reaction time of the whole system should be less than 5 ms. With this time constraint, the control subsystem 1600 has a bandwidth of greater than or equal to 1 kHz (i.e., >=1 kHz). The control subsystem 1600 further is designed to have sufficient computing power such that latency is less than or equal to 1 ms (<=1 ms) The bandwidth for the wireless communication link of the control subsystem 1600 is likewise at least 1 kHz (i.e., 1>=1 kHz).

As can be seen, the control subsystem 1600 includes a processor 1605 and a brake controller 1610 operatively connected to the processor 1605 that is configured to control the braking of the trailer 115. The processor 1605 has sufficient bandwidth and latency to satisfy the above-mentioned requirements. In one form, the brake controller 1610 is configured to control the braking of the trailer 115 in the fashion similar to the smart braking system described in U.S. patent application Ser. No. 16/251,565, filed Jan. 18, 2019, which is hereby incorporated by reference in its entirety.

The control subsystem 1600 further includes a Light Fidelity transceiver ("LiFi") 1615 and one or more cameras 1620 that are operatively connected to the processor 1605. The control subsystem 1600 further includes one or more parking sensors 1625 for sensing any number of characteristics, such as brake status and collision avoidance. In one form, the parking sensors 1625 are incorporated into the bumper 415 of the TOAD 1500, but the parking sensors 1625 can be located elsewhere on the TOAD 1500.

In automotive applications, radar or LIDAR systems are commonly used, but it was found that these systems currently have an update frequency of 10 Hz which is too slow for the TOAD 1500. Ultrasonic systems were similarly found to be too slow. It was discovered that low resolution optical imaging systems are available at 1 kHz. Generally speaking, most in the field would not pick these low resolution imaging systems because the imaging resolution of these systems is too low for general autonomous vehicle use. However, it was found that these low resolution imaging systems can be employed in the TOAD 1500 because the range is limited to between 5 and 15 feet between the pilot vehicle 105 and the TOAD 1500 such that high resolution imaging is not required. In one example, the cameras 1620 are 1 kHz low resolution optical imaging systems. By accepting this range compromise, the control subsystem 1600 can achieve the necessary image processing bandwidth.

For a secure wireless communication link, there are a wide range of radio frequency (RF) systems available. However, these RF systems are all susceptible to electromagnetic interference (EMI) and potential hacking. In order to prevent hacking, additional layers of security are implemented with RF systems that cause a delay in communication. Once more, the control subsystem 1600 requires minimal communication latency. Again, the RF signal may be temporarily blocked by EMI sources such as lightning. This EMI interference would then cause the control subsystem 1600 to be unable to communicate for longer than the acceptable window. Due to the close proximity between the pilot vehicle 105 and the TOAD 1500, any communication loss can be detrimental.

In the illustrated example, the control subsystem 1600 includes the Light Fidelity transceiver ("LiFi") 1615. It was unexpectedly discovered that LiFi communication provides a unique alternative wireless communications architecture that is well suited for the TOAD 1500. LiFi communication has low latency and is not very susceptible to EMI sources such as lightning. LiFi offers speeds up to 100 Gigabits per second and is highly directional so that the LiFi transceiver 1615 can be aimed narrowly between the pilot vehicle 105 and the TOAD 1500. This narrow focus precludes interference, either natural or malevolent (i.e., hacking), from external sources. Again, the close proximity of the pilot vehicle 105 and the TOAD 1500 (so that no car can squeeze in between) ensures the line of sight is maintained between the pilot vehicle 105 and the TOAD 1500, thereby enabling the use of the latency LiFi connection for the communication link.

The control subsystem 1600 in FIG. 16 further includes an inertial measurement unit ("IMU") 1630 operatively connected to the processor 1605. The inertial measurement unit 1630 measures the orientation and acceleration of the TOAD 1500 and provides this information to the processor 1605. The inertial measurement unit 1630 can for example include one or more accelerometers and gyroscopes, but the inertial measurement unit 1630 can include other features such as a Global Positioning System (GPS). In one example, the inertial measurement unit 1630 is able to measure orientation and acceleration of the TOAD 1500 along nine (9) axes, but in other examples, the inertial measurement unit 1630 can monitor along more or less axes. In the illustrated example, the inertial measurement unit 1630 is depicted as being directly connected to the processor 1605, but the inertial measurement unit 1630 can be indirectly connected to the processor 1605 in other examples.

Figure 17:
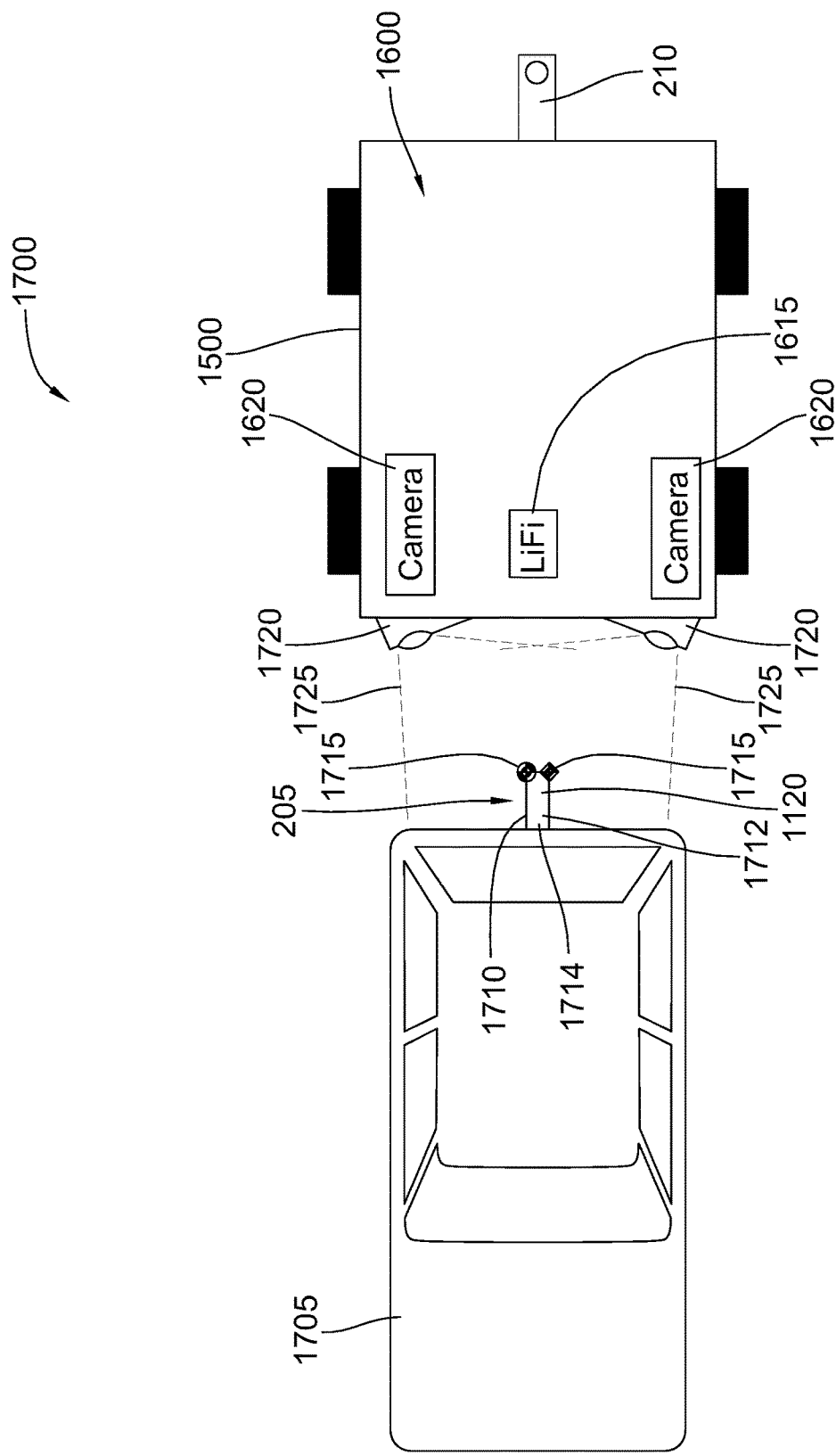
FIG. 17 is a top view of a trailer hauling system that includes the FIG. 15 TOAD.

FIG. 17 illustrates one example of a trailer hauling system 1700 that incorporates the TOAD 1500 of FIGS. 15 and 16. In FIG. 17, the trailer 115 is not shown so that the other components of the trailer hauling system 1700 can be better visualized. Like in FIG. 1, the TOAD 1500 is configured to tow the trailer 115 such as via the TOAD tow hitch 210 shown in FIG. 17 and/or the fifth-wheel coupling 405 in FIG. 4. In selected use cases, the TOAD 1500 may not tow the trailer 115 all of the time. For example, the TOAD 1500 can include the folding sides 410 for carrying cargo on the TOAD 1500. In other examples, the TOAD 1500 can be rented, and the TOAD 1500 is designed to be returned to the rental agency with or without the trailer 115.

Similar to the TOAD interface 205 in FIG. 2, the trailer hauling system 1700 includes a pilot vehicle 1705 which the TOAD 1500 follows in a semi-autonomous manner. Once more, the pilot vehicle 1705 and TOAD 1500 are not physically connected together but are virtually connected together such that the TOAD 1500 follows the pilot vehicle 1705. In the illustrated example, the trailer hauling system 1700 further includes a TOAD interface 1710 installed on the pilot vehicle 1705. In one form, the TOAD interface 1710 is integrated into the pilot vehicle 1705 by the Original Equipment Manufacturer (OEM) during initial assembly. In other forms, the TOAD interface 1710 is installed onto the pilot vehicle 1705 as an aftermarket product. In the illustrated example, the pilot vehicle 1705 includes a tow hitch 1712 with a receiver 1714 in which the TOAD interface 1710 is received or otherwise coupled. The TOAD interface 1710 further include one or more optical markers 1715 that are tracked by the cameras 1620 to locate the position and distance of the pilot vehicle 1705 relative to the TOAD 1500. In the illustrated example, the TOAD interface 1710 includes two (2) optical markers 1715 so that the location of the optical markers 1715 are readily tracked by the cameras 1620, but the TOAD interface 1710 can include more or less in other examples. The optical markers 1715 are angled at a transverses angle relative to the longitudinal axis of the pilot vehicle 1705 so that each optical marker 1715 generally faces a corresponding camera 1620.

In the depicted example, the control subsystem 1600 includes two cameras 1620 that are mounted at the front corners of the control subsystem 1600 that face the control subsystem 1600. The cameras 1620 in this example include high speed monochrome cameras. Each camera 1620 on the front corners of the TOAD 1500 has a camera lens 1720 with a Field of View ("FoV") 1725 as shown in FIG. 17. The FoV 1725 for each camera lens 1720 in the depicted example is nearly perpendicular or ninety degrees (90°), but the cameras 1620 can have different FoVs 1725 in other examples. By using two or more camera lens 1720, the TOAD 1500 is able to determine the distance and/or offset between the TOAD 1500 and the pilot vehicle 1705 such as through triangulation of the optical markers 1715.

Figure 18:
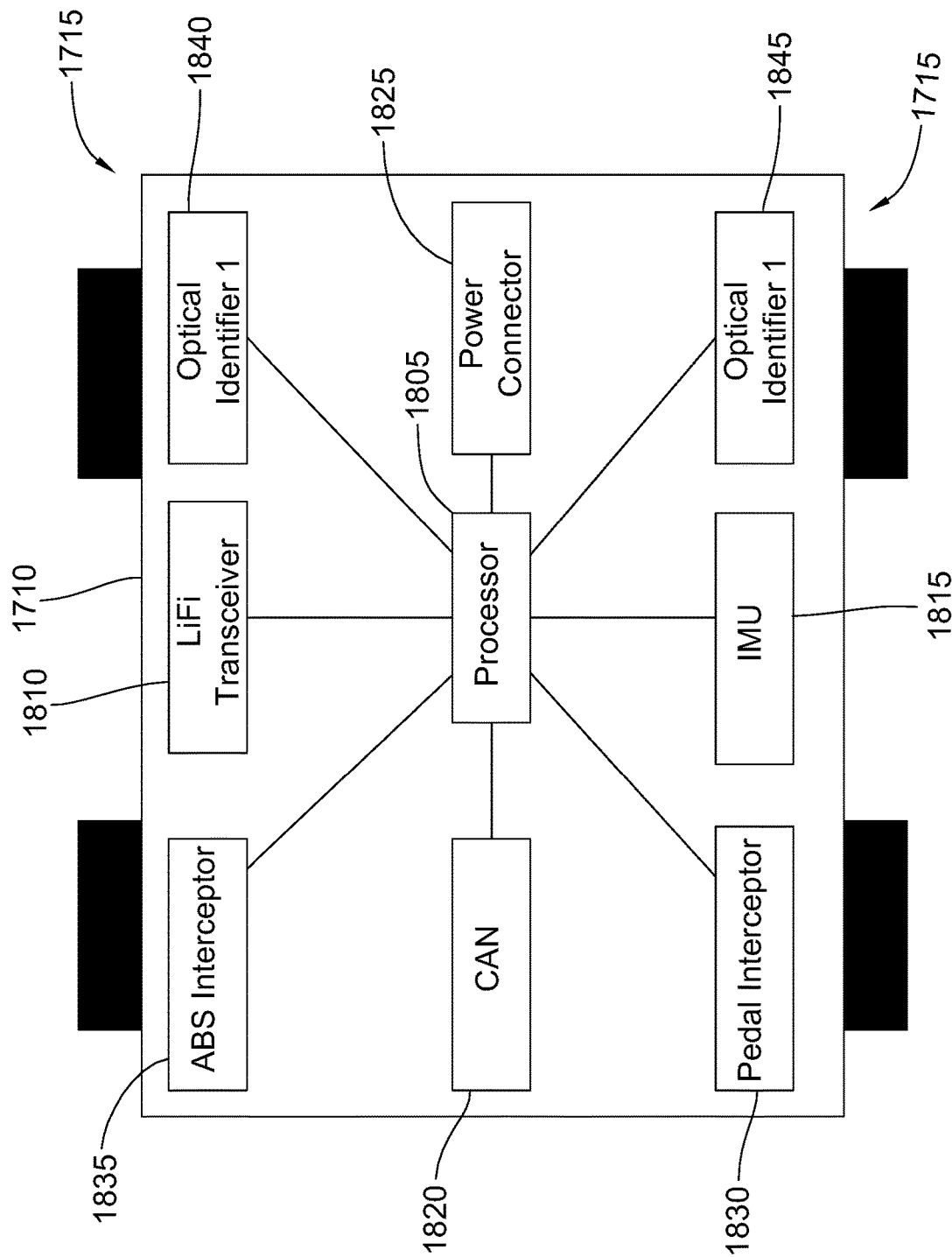
FIG. 18 is a top view of a TOAD interface used in the FIG. 17 trailer hauling system.

FIG. 18 shows a diagrammatic view of the TOAD interface 1710 shown in FIG. 17. The TOAD interface 1710 includes a processor 1805 and a LiFi transceiver 1810 operatively coupled to the processor 1805 for communicating signals with the LiFi transceiver 1615 of the TOAD 1500 so as to control the operation of the trailer hauling system 1700. The TOAD interface 1710 further includes an inertial measurement unit ("IMU") 1815 that is operatively connected to the processor 1805. The inertial measurement unit 1815 measures the orientation and acceleration of the pilot vehicle 1705 and provides this information to the processor 1805. The inertial measurement unit 1815 can for example include one or more accelerometers and gyroscopes, but the inertial measurement unit 1815 can include other features such as a GPS. In one example, the inertial measurement unit 1815 is able to measure orientation and acceleration of the pilot vehicle 1705 along nine (9) axes, but in other examples, the inertial measurement unit 1815 can monitor along more or less axes. In the illustrated example, the inertial measurement unit 1815 is depicted as being directly connected to the processor 1805, but the inertial measurement unit 1815 can be indirectly connected to the processor 1805 in other examples.

The acceleration, velocity, and/or directional information from the inertial measurement unit 1815 on the pilot vehicle 1705 that is transmitted by the LiFi transceiver 1810, in conjunction with similar information from the inertial measurement unit 1630 on the TOAD 1500, informs the processor 1605 of the TOAD 1500 of the relative orientation of the TOAD 1500 and the pilot vehicle 1705 for steering of the TOAD 1500 via the steering actuator 1515. The LiFi transceiver 1810 further transmits acceleration, velocity, and/or directional information from the inertial measurement unit 1815 on the pilot vehicle 1705 to the LiFi transceiver 1615 of the TOAD 1500. In conjunction with similar information from the inertial measurement unit 1630 on the TOAD 1500, the processor 1605 of the TOAD 1500 is able to determine the relative velocity and/or acceleration between the TOAD 1500 and the pilot vehicle 1705 so as to control the velocity, acceleration, and/or braking of the TOAD 1500. For example, the processor 1605 of the TOAD 1500 can apply braking via the electric brake actuator 1520 and/or the hydraulic brake actuator 1525, and the processor 1605 can generally match acceleration (or deceleration) of the pilot vehicle 1705 by controlling torque supplied to the electric motors 610.

The processor 1805 is able to monitor other operational parameters of the pilot vehicle 1705 via a controller area network ("CAN") 1820 of the pilot vehicle 1705 that is operatively connected to the processor 1805. The TOAD interface 1710 in one example receives power from a trailer or other plug of the pilot vehicle 1705 via a power connector 1825. Additional information about the pilot vehicle 1705 is obtained from a pedal interceptor 1830 and an ABS interceptor 1835 that are operatively connected to the processor 1805 such as through wiring. The pedal interceptor 1830 and the ABS interceptor 1835 allow the TOAD interface 1710 and/or the TOAD 1500 to at least partially control the operation of the pilot vehicle 1705. The inertial measurement unit 1815 mounted on the pilot vehicle 1705 in addition to a signal indicating the brake pedal is pressed from the pedal interceptor 1830 allows the TOAD 1500 to quickly react to braking events by detecting the brake pedal being pressed and the force of the press detected in both the acceleration and pitch of the pilot vehicle 1705. Once a distance deviation between the TOAD 1500 and the pilot vehicle 1705 is determined, the TOAD 1500 will attempt to accelerate or decelerate to match the speed of the pilot vehicle 1705. In the case where the pilot vehicle 1705 accelerates too fast or brakes too fast, feedback is introduced in the pilot vehicle 1705 by reducing the acceleration or reducing the braking force via the pedal interceptor 1830 and/or ABS interceptor 1835.

In the illustrated example, the optical markers 1715 include a first optical identifier 1840 and a second optical identifier 1845 operatively connected to the processor 1805. In one form, the optical markers 1715 include optically reflective material so that the first optical identifier 1840 and second optical identifier 1845 are readily visible to their respective camera 1620. Alternatively or additionally, the optical markers 1715 can include active lighting components, such as Light Emitting Diodes (LEDs), so as to further enhance their visibility and/or to transmit additional information to the cameras 1620 and/or LiFi transceiver 1615 like a unique identifier to identify the TOAD interface 1710 on the pilot vehicle 1705. In other variations, the optical markers 1715 are passively visible and are not operatively connected to the processor 1805.

Figure 19:
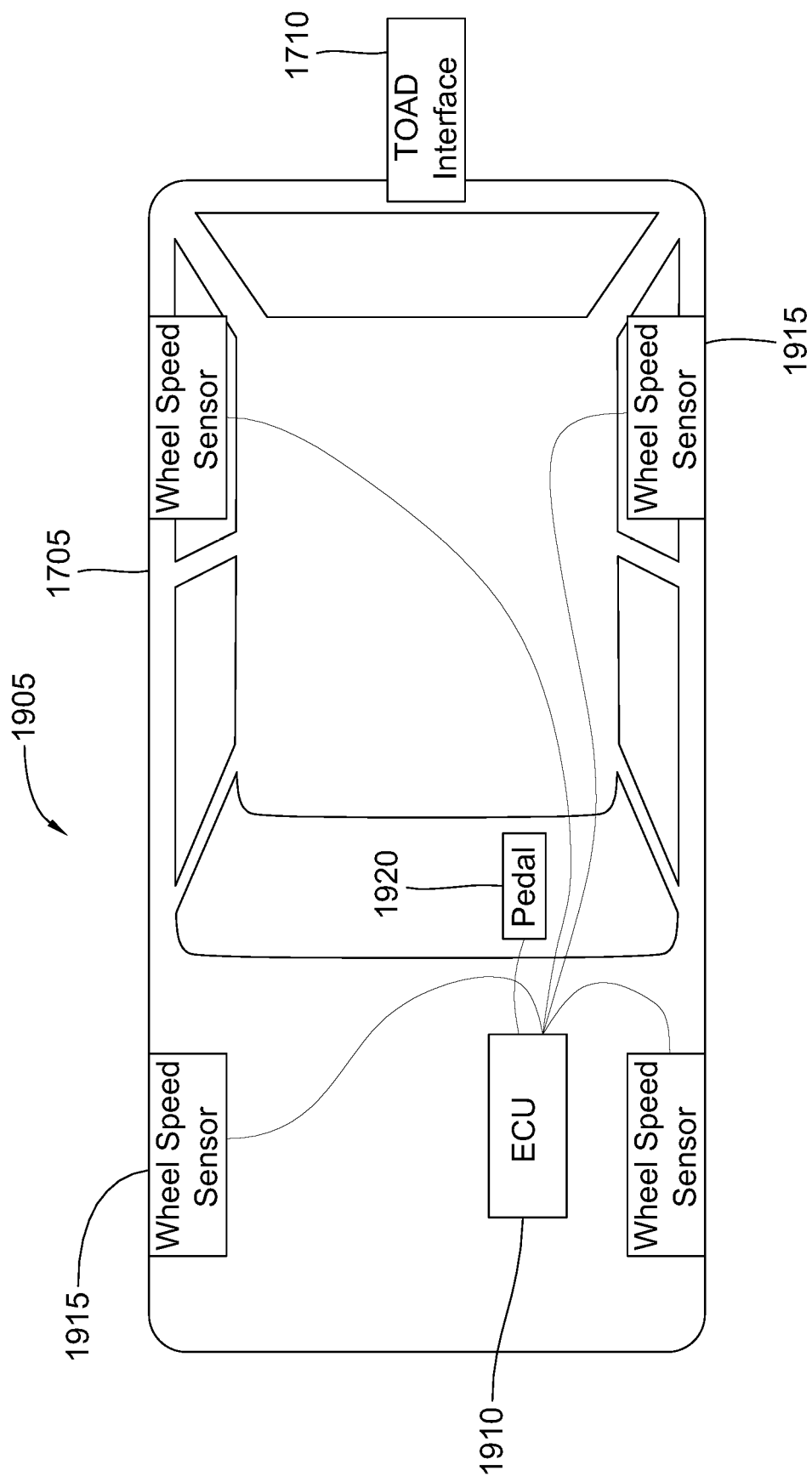
FIG. 19 is a diagrammatic view of OEM wiring in a pilot vehicle of FIG. 17 that can be used in the FIG. 17 trailer hauling system.

As noted before, the TOAD interface 1710 can be installed by an OEM or as an aftermarket product to the pilot vehicle 1705. An example of an aftermarket installation or retrofit of the TOAD interface 1710 into the pilot vehicle 1705 will now be described with reference to FIGS. 19 and 20. Original or OEM wiring 1905 of the pilot vehicle 1705 is illustrated in FIG. 19. It should be noted that only select components of the pilot vehicle 1705 that relate to the TOAD interface 1710 are illustrated in the drawings and discussed below. It should be appreciated that the pilot vehicle 1705 includes other components that are not illustrated in FIGS. 19 and 20 (or are illustrated in the other drawings) for the sake of clarity. As can be seen, the pilot vehicle 1705 includes an Engine Control Unit ("ECU") 1910 that senses and controls the general operation of the pilot vehicle 1705. One or more wheel speed sensors 1915 sense the speed of the wheels of the pilot vehicle 1705. Typically, but not always, the wheel speed sensors 1915 are integrated in the ABS for the pilot vehicle 1705. The pilot vehicle 1705 further includes one or more pedals 1920, such as the acceleration and brake foot pedals, for controlling the speed of the pilot vehicle 1705. With the OEM wiring 1905, the wheel speed sensors 1915 and the pedals 1920 are directly wired to the ECU 1910.

Figure 20:
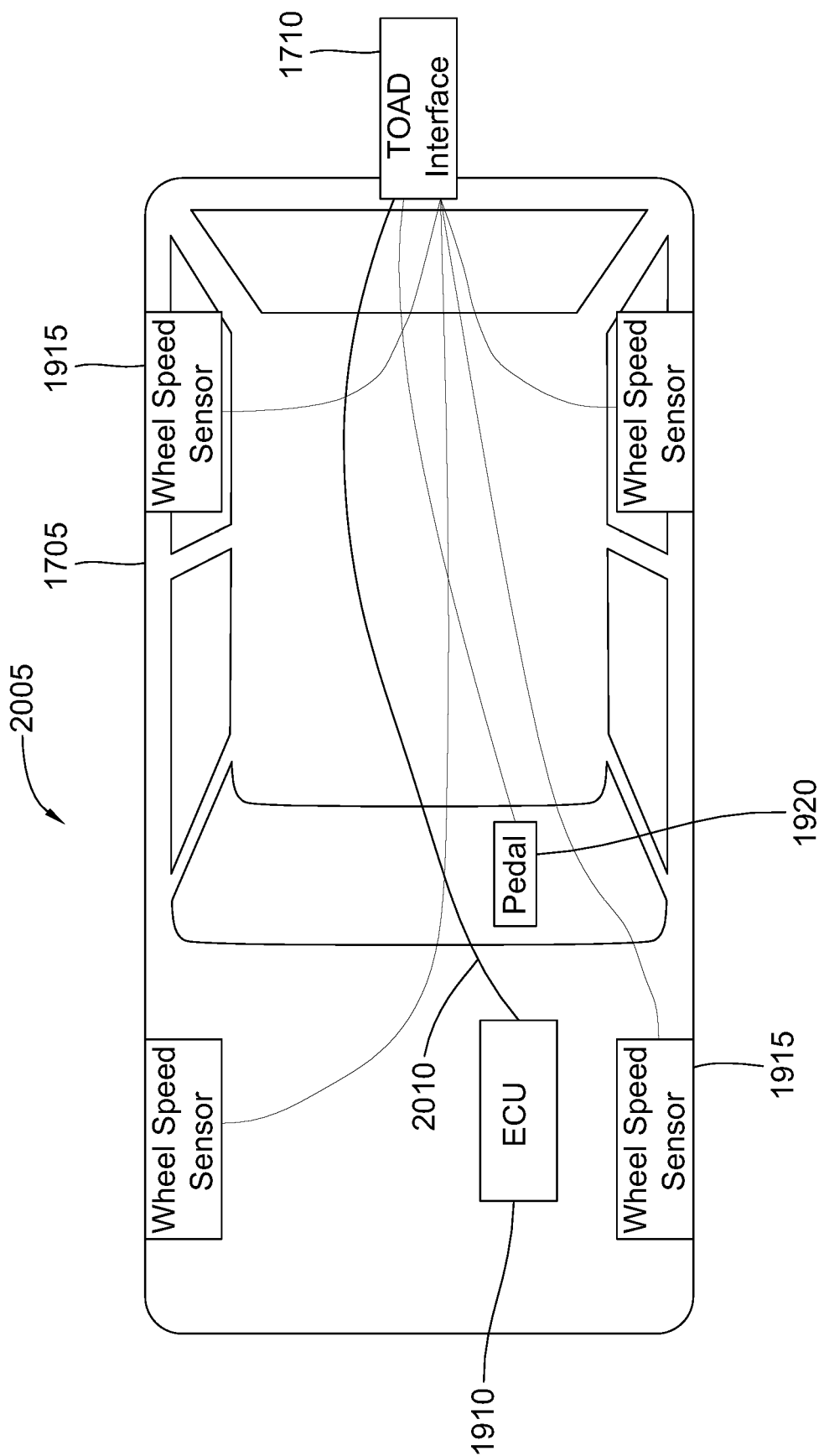
FIG. 20 is a diagrammatic view of a TOAD interface wiring for the FIG. 17 pilot vehicle.

An aftermarket installation of the TOAD interface 1710 in the pilot vehicle 1705 is depicted in FIG. 20. As shown, the pilot vehicle 1705 has been rewired from the OEM wiring 1905 in FIG. 19 to a TOAD interface wiring 2005 shown in FIG. 20. In the illustrated example, the wheel speed sensors 1915 and pedals 1920 are wired or directly connected to the TOAD interface 1710. The ECU 1910 is directly connected to the TOAD interface 1710 via a TOAD interface harness 2010. With the TOAD interface wiring 2005, the relevant signals first go to the TOAD interface 1710 before being retransmitted to the ECU 1910. As will be explained below, this TOAD interface wiring 2005 allows the TOAD interface 1710 to take preemptive action for the pilot vehicle 1705 and/or better coordinate actions with the TOAD 1500.

Referring to FIGS. 18 and 20, the TOAD interface 1710 in the pilot vehicle 1705 intercepts both the accelerator pedal lines from the pedals 1920 via the pedal interceptor 1830 and the wheel speed lines via the wheel speed sensors 1915. In one form, accelerator pedals are zero to five volt (0-5 V) analog output devices (with a redundant value running a corresponding 5 V to 0 V or 0 V to 2.5V). In another form, the accelerator pedals utilize Pulse Width Modulation (PWM) (e.g., 5% to 95%). In one example, the pedal interceptor 1830 of the TOAD interface 1710 sits between the pedals 1920 and ECU 1910. The pedal interceptor 1830 is for example configured to emulate a lesser pedal position when required. Extending the braking distance of the pilot vehicle 1705 can help prevent a collision between the TOAD 1500 and the pilot vehicle 1705. To extend the braking distance, the ABS interceptor 1835 in the TOAD interface 1710 sits between the wheel speed sensors 1915 and the ECU 1910. When extending the braking distance is required, such as when the pilot vehicle 1705 is decelerating faster than the TOAD 1500, the TOAD interface 1710 feeds a simulated wheel speed signal to the ECU 1910 that indicates, by reducing the signal frequency, that the wheels of the pilot vehicle 1705 are locked up thus activating the ABS. Activating the ABS in turn extends the braking distance. In other words, the TOAD interface 1710 in this configuration is able to derate the operational parameters of the pilot vehicle 1705 to better match with the TOAD 1500. In other variations, the TOAD 1500 operates without any type of interceptor implemented in the pilot vehicle 1705. In such a case, an audible alarm or other alert is generated in the cabin of the pilot vehicle 1705. The tone of the alarm indicates to the driver to reduce the level of acceleration or braking based on the frequency and/or amplitude of the tone.

The TOAD interface 1710 on the pilot vehicle 1705 and the processor 1605 on the TOAD 1500 maintain system logs in case of an accident. In the case where this reduced stopping distance leads to the pilot vehicle 1705 impacting a vehicle or other object, then the collision would have likely have occurred in a similarly situated traditional mechanical coupling with the trailer 115 and associated stopping distance. The system logs or driving recorders are implemented on both the TOAD 1500 and the TOAD interface 1710 on the pilot vehicle 1705 to help prove afterwards that the systems were braking at maximum levels and could not have stopped shorter even if mechanically coupled together.

In a rare case, the TOAD 1500 may hit the pilot vehicle 1705 because the pilot vehicle 1705 out-brakes the TOAD 1500 or impacts something. As noted before, the TOAD 110 in FIG. 4 as well the other ones include the bumper 415 to minimize damage to the TOAD 1500 and the pilot vehicle 1705. Alternatively or additionally, the receiver 1714 on the pilot vehicle 1705 can have an extended reach and incorporate an integrated shock absorber. In this example, the TOAD 1500 has a corresponding catcher receptacle where the impact between the TOAD 1500 and the pilot vehicle 1705 will first occur. Typically, since the TOAD 1500 will be attempting to match the speed of the pilot vehicle 1705, the relative speeds for the impact will be small. The resulting impact force transferred from the catcher receptacle on the TOAD 1500 to the shock absorber in the receiver 1714 of the pilot vehicle 1705 should be small. Moreover, the receiver 1714 is attached to the frame of the pilot vehicle 1705 in such a way to minimize damage during any impact. In the case of most impacts, there will be little to no damage to the pilot vehicle 1705.

As mentioned before, the TOADs 110 can be rented or sold depending on the circumstances. For example, the TOADs 110 can be rented to tow campers during vacations or equipment for temporary building sites. To ensure authorized use for security purposes, the control subsystem 1600 on the TOAD 1500 and the TOAD interface 1710 on the pilot vehicle 1705 synchronize with one another by exchanging authentication keys. If the pilot vehicle 1705 is authorized, the TOAD 1500 will then proceed to follow the pilot vehicle 1705. On the other hand, if not authorized, the TOAD 1500 will not follow the pilot vehicle 1705 and will typically remain stationary. The TOAD 1500 can also send an alert or issue an alarm, such as a sound, when unauthorized use is attempted. This authentication ability further facilitates exchanging pilot vehicles 1705 when the TOAD 1500 and trailer 115 are moving such as moving down a highway or in a parking lot. A second pilot vehicle 1705 can pull alongside a first pilot vehicle 1705 that the TOAD 1500 is following. The driver through the TOAD interface 1710 (e.g., by pushing a button on a smartphone app or a physical button) can initiate the authentication process. In addition to the key exchanging authentication process described before, the TOAD 1500 can send a message to the driver of the first pilot vehicle 1705 requesting authorization of the transfer to the second pilot vehicle 1705 to ensure a safe and proper transfer. Once authorized, the TOAD 1500 towing the trailer 115 will then proceed to follow the second pilot vehicle 1705.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"Aftermarket Product" generally refers to one or more parts and/or accessories used in repair and/or enhancement of a product already made and sold by an Original Equipment Manufacturer (OEM). For example, aftermarket products can include spare parts, accessories, and/or components for motor vehicles.

"Brake" generally refers to a device for arresting and/or preventing the motion of a mechanism usually via friction, electromagnetic, and/or other forces. Brakes for example can include equipment in automobiles, bicycles, or other vehicles that are used to slow down and/or stop the vehicle. In other words, a brake is a mechanical device that inhibits motion by absorbing energy from a moving system. The brake can be for example used for slowing or stopping a moving vehicle, wheel, and/or axle, or to prevent its motion. Most often, this is accomplished by friction. Types of brakes include frictional, pressure, and/or electromagnetic type braking systems. Frictional brakes for instance can include caliper, drum, and/or disc drakes. Electromagnetic type braking systems for example can include electrical motor/generators found in regenerative braking systems.

"Bumper" generally refers to a device or structure configured to absorb some shock and/or reduce damage. In one non-limiting example, the bumper includes a flexible member, such as made from an elastomeric material, that bends when a certain threshold force is applied to the bumper. In another non-limiting example, the bumper includes a pivotal member that is biased by a spring that yields when the threshold force is applied.

"Cargo" or "Cargo Items" generally refer to goods or other physical objects that are typically carried or otherwise transported on vehicles, such as on trucks, ships, aircraft, spacecraft, and/or motor vehicles. The cargo items can be unpackaged or packaged, such as in boxes, bags, bales, containers, barrels, and tanks, to name just a few examples.

"Cargo Carrier" generally refers to any structure used to transport and/or store cargo items, such as flatbed trailers, trailers, semitrailers, trucks, intermodal containers, refrigerated trailers, and railcars, to just name a few examples. The cargo carrier can be transported in any number of ways, such as over land, sea, space, and/or air. Certain types of cargo carriers, like intermodal containers, are designed to be transported in a number of manners, such as via a truck, in a ship, and via rail. The cargo carrier can be fully enclosed, such as when in the form of a semi-trailer or cargo container, or open to the outside environment, such as with a flatbed trailer.

"Chassis" generally refers to an internal frame and/or supporting structure that supports an external object, body, and/or housing of the vehicle and/or electronic device. In one form, the chassis can further provide protection for internal parts of the vehicle and/or electronic device. By way of non-limiting examples, a chassis can include the underpart of a vehicle, including the frame on which the body is mounted. In an electronic device, the chassis for example includes a frame and/or other internal supporting structure on which one or more circuit boards and/or other electronics are mounted.

"Conductor" or "Conductive Material" generally refers to a material and/or object that allows the free flow of an electrical charge in one or more directions such that relatively significant electric currents will flow through the material under the influence of an electric field under normal operating conditions. By way of non-limiting examples, conductors include materials having low resistivity, such as most metals (e.g., copper, gold, aluminum, etc.), graphite, and conductive polymers.

"Controller" generally refers to a device, using mechanical, hydraulic, pneumatic electronic techniques, and/or a microprocessor or computer, which monitors and physically alters the operating conditions of a given dynamical system. In one nonlimiting example, the controller can include an Allen Bradley brand Programmable Logic Controller (PLC). A controller may include a processor for performing calculations to process input or output. A controller may include a memory for storing values to be processed by the processor, or for storing the results of previous processing. A controller may also be configured to accept input and output from a wide array of input and output devices for receiving or sending values. Such devices include other computers, keyboards, mice, visual displays, printers, industrial equipment, and systems or machinery of all types and sizes. For example, a controller can control a network or network interface to perform various network communications upon request. The network interface may be part of the controller, or characterized as separate and remote from the controller.

A controller may be a single, physical, computing device such as a desktop computer, or a laptop computer, or may be composed of multiple devices of the same type such as a group of servers operating as one device in a networked cluster, or a heterogeneous combination of different computing devices operating as one controller and linked together by a communication network. The communication network connected to the controller may also be connected to a wider network such as the Internet. Thus a controller may include one or more physical processors or other computing devices or circuitry, and may also include any suitable type of memory. A controller may also be a virtual computing platform having an unknown or fluctuating number of physical processors and memories or memory devices. A controller may thus be physically located in one geographical location or physically spread across several widely scattered locations with multiple processors linked together by a communication network to operate as a single controller. Multiple controllers or computing devices may be configured to communicate with one another or with other devices over wired or wireless communication links to form a network. Network communications may pass through various controllers operating as network appliances such as switches, routers, firewalls or other network devices or interfaces before passing over other larger computer networks such as the Internet. Communications can also be passed over the network as wireless data transmissions carried over electromagnetic waves through transmission lines or free space. Such communications include using WiFi or other Wireless Local Area Network (WLAN) or a cellular transmitter/receiver to transfer data.

"Controller Area Network" or "CAN" generally refers to a vehicle bus standard designed to allow microcontrollers, sensors, and/or other devices to communicate with each other in applications without necessarily a host computer. CAN systems include a message-based protocol, designed originally for multiplex electrical wiring within automobiles, but is also used in many other contexts. A vehicle with a CAN system may normally, but not always, include multiple Electronic Control Units (ECUs) which can be also called nodes. These ECUs can include Engine Control Modules (ECMs) and Transmission Control Modules (TCMs) as well as other control units such as for airbags, antilock braking/ABS, cruise control, electric power steering, audio systems, power windows, doors, mirror adjustment, battery and/or hybrid/electric recharging systems, to name just a few. A CAN includes a multi-master serial bus standard for connecting ECUs. The complexity of the ECU or node can range from a simple Input/Output (I/O) device up to an embedded computer with a CAN interface and software. The ECU or node can also act as a gateway allowing a general purpose computer to communicate over an interface, such as via a USB and/or Ethernet port, to the devices on the CAN network. Each ECU usually, but not always, includes a central processing unit, a CAN controller, and transceiver. The CAN systems can for example include low speed CAN (128 Kbps) under the ISO 11898-3 standard, high speed CAN (512 Kbps) under the ISO 11898-2 standard, CAN FD under the ISO 11898-1 standard, and single wire CAN under the SAE J2411 standard.

"Couple" or "Coupled" generally refers to an indirect and/or direct connection between the identified elements, components, and/or objects. Often the manner of the coupling will be related specifically to the manner in which the two coupled elements interact.

"Electric Motor" generally refers to an electrical machine that converts electrical energy into mechanical energy. Normally, but not always, electric motors operate through the interaction between one or more magnetic fields in the motor and winding currents to generate force in the form of rotation. Electric motors can be powered by direct current (DC) sources, such as from batteries, motor vehicles, and/or rectifiers, or by alternating current (AC) sources, such as a power grid, inverters, and/or electrical generators. An electric generator can (but not always) be mechanically identical to an electric motor, but operates in the reverse direction, accepting mechanical energy and converting the mechanical energy into electrical energy.

"Electronic Control Unit (ECU)" or "Electronic Control Module (ECM)" generally refers to an embedded system in electronics of a vehicle that controls one or more electrical systems and/or subsystems of the vehicle. Usually, but not always, ECUs communicate over a Controller Area Network (CAN) and can act as nodes over the CAN. The complexity of the ECU or node can range from a simple Input/Output (I/O) device up to an embedded computer with a CAN interface and software. The ECU or node can also act as a gateway allowing a general purpose computer to communicate over an interface, such as via a USB and/or Ethernet port, to the devices on the CAN network. Each ECU usually, but not always, includes a central processing unit, a CAN controller, and a transceiver. These ECUs can for instance include Engine Control Modules (ECMs) and Transmission Control Modules (TCMs) as well as other control units such as for airbags, antilock braking/ABS, cruise control, electric power steering, audio systems, power windows, doors, mirror adjustment, battery and/or hybrid/electric recharging systems, to name just a few. By way of nonlimiting examples, types of ECUs can include ECMs, TCMs, Powertrain Control Module (PCMs), Brake Control Modules (BCMs or EBCMs), Central Control Modules (CCMs), Central Timing Modules (CTMs), General Electronic Modules (GEMs), Body Control Modules (BCMs), and/or Suspension Control Modules (SCMs), to name just a few.

"Energy Source" generally refers to a device, structure, mechanism, and/or system that provides power for performing work. The energy supplied by the energy source can take many forms including electrical, chemical, electrochemical, nuclear, hydraulic, pneumatic, gravitational, kinetic, and/or potential energy forms. The energy source for instance can include ambient energy sources, such as solar panels, external energy sources, such as from electrical power transmission networks, and/or portable energy sources, such as batteries. The energy source can include an energy carrier containing energy that can be later converted to other forms, such as into mechanical, heat, electrical, and/or chemical forms. Energy carriers can for instance include springs, electrical batteries, capacitors, pressurized air, dammed water, hydrogen, petroleum, coal, wood, and/or natural gas, to name just a few.

"Energy Storage System" (ESS) or "Energy Storage Unit" generally refers to a device that captures energy produced at one time for use at a later time. The energy can be supplied to the ESS in one or more forms for example including radiation, chemical, gravitational potential, electrical potential, electricity, elevated temperature, latent heat, and kinetic types of energy. The ESS converts the energy from forms that are difficult to store to more conveniently and/or economically storable forms. By way of non-limiting examples, techniques for accumulating the energy in the ESS can include: mechanical capturing techniques, such as compressed air storage, flywheels, gravitational potential energy devices, springs, and hydraulic accumulators; electrical and/or electromagnetic capturing techniques, such as using capacitors, super capacitors, and superconducting magnetic energy storage coils; biological techniques, such as using glycogen, biofuel, and starch storage mediums; electrochemical capturing techniques, such as using flow batteries, rechargeable batteries, and ultra-batteries; thermal capture techniques, such as using eutectic systems, molten salt storage, phase-change materials, and steam accumulators; and/or chemical capture techniques, such as using hydrated salts, hydrogen, and hydrogen peroxide. Common ESS examples include lithium-ion batteries and super capacitors.

"Extended Position" generally refers to a location or state of a mechanism where at least a portion is stretched out to be longer or bigger. For example, when in the extended position, at least a portion of the drawbar extends from a body of the towed vehicle. When in the extended position, the drawbar does not need to be stretched to the fullest extent possible (i.e., fully extended), but instead, it can be partly lengthened (i.e., partially extended).

"Fastener" generally refers to a hardware device that mechanically joins or otherwise affixes two or more objects together. By way of nonlimiting examples, the fastener can include bolts, dowels, nails, nuts, pegs, pins, rivets, screws, and snap fasteners, to just name a few.

"Fifth-Wheel Coupling" generally refers to a horse-shaped device on a towing vehicle, such as a tractor or truck, that is configured to receive a kingpin on a trailer, such as a semitrailer or camper trailer, so as to provide a mechanical link between the towing vehicle and the trailer. For example, some camper trailers use a fifth-wheel configuration, requiring the fifth-wheel coupling to be installed in the bed of a pickup truck. As the connected truck turns, the downward-facing surface of the trailer with the kingpin at the center rotates against an upward-facing surface of the fixed fifth wheel coupling that does not rotate. To reduce friction, grease is sometimes applied to this surface of the fifth wheel coupling. This fifth-wheel configuration is sometimes called a turn-table in Australia and New Zealand. Typically, but not always, the fifth-wheel coupling is located directly above an axle or between the axles of a vehicle.

"Frame" generally refers to a structure that forms part of an object and gives strength and/or shape to the object.

"Guidance, Navigation, and Control (GNC) System" generally refers to a physical device, a virtual device, and/or a group of devices configured to control the movement of vehicles, such as automobiles, automated guided vehicles, ships, aircraft, drones, spacecraft, and/or other moving objects. GNC systems are typically configured to determine a desired path of travel or trajectory of the vehicle from the vehicle's current location to a designated target, as well as desired changes in velocity, rotation, and/or acceleration for following the path. The GNC system can include and/or communicate with sensors like compasses, GPS receivers, Loran-C, star trackers, inertial measurement units, altimeters, environmental sensors, and the like. At a given time, such as when the vehicle is travelling, the GNC system is configured to determine the location (in one, two, or three dimensions) and velocity of the vehicle. For example, the GNC system is able to calculate changes in position, velocity, attitude, and/or rotation rates of a moving vehicle required to follow a certain trajectory and/or attitude profile based on information about the state of motion of the vehicle. The GNC system is able to maintain or change movement of the vehicle by manipulating forces by way of vehicle actuators, such as steering mechanisms, thrusters, flaps, etc., to guide the vehicle while maintaining vehicle stability. GNC systems can be found in autonomous or semi-autonomous vehicles.

"Inertial Measurement Unit" or "IMU" generally refers to a device that measures and reports a body's specific force, angular rate, and sometimes the magnetic field surrounding the body. The IMU typically, but not always, includes one or more accelerometers and gyroscopes, and sometimes magnetometers when the surrounding magnetic fields are measured. IMUs are typically (but not always) self-contained systems that measure linear and angular motion usually with a triad of gyroscopes and triad of accelerometers. An IMU can either be gimballed or strapdown, outputting the integrating quantities of angular velocity and acceleration in the sensor/body frame. They are commonly referred to in literature as the rate-integrating gyroscopes and accelerometers. IMUs typically can be used in a wide variety of circumstances such as to maneuver vehicles, aircraft, and/or spacecraft as well as in cellphones and virtual reality glasses. The accelerometers in IMUs can include mechanical and/or electronic type accelerometers, and the gyroscopes in IMUs can include mechanical and/or electronic type gyroscopes.

"Input/Output (I/O) Device" generally refers to any device or collection of devices coupled to a computing device that is configured to receive input and deliver the input to a processor, memory, or other part of the computing device and/or is controlled by the computing device to produce an output. The I/O device can include physically separate input and output devices, or the input and output devices can be combined together to form a single physical unit. Such input devices of the I/O device can include keyboards, mice, trackballs, and touch sensitive pointing devices such as touchpads or touchscreens. Input devices also include any sensor or sensor array for detecting environmental conditions such as temperature, light, noise, vibration, humidity, and the like. Examples of output devices for the I/O device include, but are not limited to, screens or monitors displaying graphical output, a projecting device projecting a two-dimensional or three-dimensional image, or any kind of printer, plotter, or similar device producing either two-dimensional or three-dimensional representations of the output fixed in any tangible medium (e.g., a laser printer printing on paper, a lathe controlled to machine a piece of metal, or a three-dimensional printer producing an object). An output device may also produce intangible output such as, for example, data stored in a database, or electromagnetic energy transmitted through a medium or through free space such as audio produced by a speaker controlled by the computer, radio signals transmitted through free space, or pulses of light passing through a fiber-optic cable.

"Insulator" or "Insulative Material" generally refers to a material and/or object whose internal electric charges do not flow freely such that very little electric current will flow through the material under the influence of an electric field under normal operating conditions. By way of non-limiting examples, insulator materials include materials having high resistivity, such as glass, paper, ceramics, rubber, and plastics.

"Light Fidelity (LiFi)" or "Li-Fi" generally refers to a wireless communication system for communicating data between devices using light to transmit the data. In other words, LiFi is a light communications system that is capable of transmitting data at high speeds over the visible light spectrum, ultraviolet spectrum, and/or infrared spectrum. Using light to transmit data allows LiFi to work across higher bandwidths, to work in areas susceptible to electromagnetic interference (EMI), and to provide higher transmission speeds. In one non-limiting example, Light Emitting Diodes (LEDs) in the LiFi are used to transmit and receive the light signals.

"Longitudinal" generally refers to the length or lengthwise dimension of an object, rather than across.

"Original Equipment Manufacturer" or "OEM" generally refers to an organization that makes finished devices from component parts bought from other organizations that are usually sold under their own brand in a consumer or commercial market.

"Power Converter" generally refers to a device that changes one form of energy to another form. In electrical systems, power converters change electric energy from one form to another, such as converting alternating current (AC) to direct current (DC) (or vice-versa) and/or changing electrical voltage, current, frequency, and/or phase of the electricity. For DC to DC conversion, the power converter can include voltage regulators and/or linear regulators. The power converter can include an inverter to change DC to AC, and the power converter can include a rectifier to change AC to DC. For AC to AC conversion, the power converter can include a transformer, autotransformer, variable-frequency transformer, voltage converter, voltage regulator, and/or cycloconverter. These of course are just a few non-limiting examples. Power converters can also change other forms of energy, such as mechanical and/or chemical energy, to name just a few. For instance, the power converter can include a hydraulic pump that converts electrical energy to mechanical energy when the energy storage system is in the form of a hydraulic accumulator.

"Power Supply" or "Power Source" generally refers to an electrical device that provides electrical power to an electrical load, such as electrical machines and/or electronics.

"Powertrain" or "Powerplant" generally refers to devices and/or systems used to transform stored energy into kinetic energy for propulsion purposes. The powertrain can include multiple power sources and can be used in non-wheel-based vehicles. By way of nonlimiting examples, the stored energy sources can include chemical, solar, nuclear, electrical, electrochemical, kinetic, and/or other potential energy sources. For example, the powertrain in a motor vehicle includes the devices that generate power and deliver the power to the road surface, water, and/or air. These devices in the powertrain include engines, motors, transmissions, drive shafts, differentials, and final drive components (e.g., drive wheels, continuous tracks, propeller, thrusters, etc.).

"Processor" generally refers to one or more electronic components configured to operate as a single unit configured or programmed to process input to generate an output. Alternatively, when of a multi-component form, a processor may have one or more components located remotely relative to the others. One or more components of each processor may be of the electronic variety defining digital circuitry, analog circuitry, or both. In one example, each processor is of a conventional, integrated circuit microprocessor arrangement, such as one or more PENTIUM, i3, i5 or i7 processors supplied by INTEL Corporation of 2200 Mission College Boulevard, Santa Clara, Calif. 95052, USA. In another example, the processor uses a Reduced Instruction Set Computing (RISC) architecture, such as an Advanced RISC Machine (ARM) type processor developed and licensed by ARM Holdings of Cambridge, United Kingdom. In still yet other examples, the processor can include a Central Processing Unit (CPU) and/or an Accelerated Processing Unit (APU), such as those using a K8, K10, Bulldozer, Bobcat, Jaguar, and Zen series architectures, supplied by Advanced Micro Devices, Inc. (AMD) of Santa Clara, Calif.

Another example of a processor is an Application-Specific Integrated Circuit (ASIC). An ASIC is an Integrated Circuit (IC) customized to perform a specific series of logical operations for controlling the computer to perform specific tasks or functions. An ASIC is an example of a processor for a special purpose computer, rather than a processor configured for general-purpose use. An application-specific integrated circuit generally is not reprogrammable to perform other functions and may be programmed once when it is manufactured.

In another example, a processor may be of the "field programmable" type. Such processors may be programmed multiple times "in the field" to perform various specialized or general functions after they are manufactured. A field-programmable processor may include a Field-Programmable Gate Array (FPGA) in an integrated circuit in the processor. An FPGA may be programmed to perform a specific series of instructions which may be retained in nonvolatile memory cells in the FPGA. The FPGA may be configured by a customer or a designer using a Hardware Description Language (HDL). An FPGA may be reprogrammed using another computer to reconfigure the FPGA to implement a new set of commands or operating instructions. Such an operation may be executed in any suitable means such as by a firmware upgrade to the processor circuitry.

Just as the concept of a computer is not limited to a single physical device in a single location, so also the concept of a "processor" is not limited to a single physical logic circuit or package of circuits but includes one or more such circuits or circuit packages possibly contained within or across multiple computers in numerous physical locations. In a virtual computing environment, an unknown number of physical processors may be actively processing data, and the unknown number may automatically change over time as well.

The concept of a "processor" includes a device configured or programmed to make threshold comparisons, rules comparisons, calculations, or perform logical operations applying a rule to data yielding a logical result (e.g. "true" or "false"). Processing activities may occur in multiple single processors on separate servers, on multiple processors in a single server with separate processors, or on multiple processors physically remote from one another in separate computing devices.

"Retracted Position" generally refers to a location or state of a mechanism where at least a portion is shrunk to be shorter or smaller. For example, when in the retracted position, a drawbar is typically shorter than when in the extended position.

"Sensor" generally refers to an object whose purpose is to detect events and/or changes in the environment of the sensor, and then provide a corresponding output. Sensors include transducers that provide various types of output, such as electrical and/or optical signals. By way of nonlimiting examples, the sensors can include pressure sensors, ultrasonic sensors, humidity sensors, gas sensors, motion sensors, acceleration sensors, displacement sensors, force sensors, optical sensors, and/or electromagnetic sensors. In some examples, the sensors include barcode readers, RFID readers, and/or vision systems.

"Substantially" generally refers to the degree by which a quantitative representation may vary from a stated reference without resulting in an essential change of the basic function of the subject matter at issue. The term "substantially" is utilized herein to represent the inherent degree of uncertainty that may be attributed to any quantitative comparison, value, measurement, and/or other representation.

"Towable Autonomous Dray" or "TOAD" generally refers a semi-autonomous unmanned vehicle that includes an independent energy/power source and power train for towing a trailer. In one form, the TOAD is configured to follow a pilot vehicle that is driven by a human. The power train of the TOAD is independent of the power train of the pilot vehicle such that the TOAD is able to tow the trailer without any towing force being supplied by the pilot vehicle, if so desired. Typically, but not always, the TOAD has a greater towing capacity as compared to the pilot vehicle. The TOAD normally lacks driver cabin for transporting humans. The TOAD is semi-autonomous in that the TOAD is able to automatically brake and accelerate to maintain a predetermined spacing range with the pilot vehicle, but the TOAD is unable to navigate by itself for any considerable distance without the aid of the pilot vehicle or a remote human operator.

"Tow Coupler" or "Trailer Coupler" generally refers to a device used to secure a trailer, a towed vehicle, and/or other towed object to a towing vehicle. Typically, but not always, the trailer coupler is coupled to a hitch of the towing vehicle. For example, the trailer coupler can be configured to couple to a hitch ball. Common types of trailer couplers include (but are not limited to) straight tongue couplers, A-frame couplers, adjustable couplers, and fifth wheel-gooseneck couplers. The trailer coupler can include any number of mounting styles. By way of non-limiting examples, the mounting styles can include straight channel, foldaway, round tongue, A-frame, flat mount, adjustable tongue, lunette ring, gooseneck, trigger, thumb, wrap around yoke, and pin mounting styles or mechanisms. The trailer coupler in some instances can further include a trailer jack for lifting the trailer coupler to the proper height for coupling to the hitch.

"Tow Hitch", "Trailer Hitch", or "Hitch" generally refers to a device attached to a chassis of a vehicle for towing another object, such as a trailer, aircraft, wagon, and/or another vehicle, to name just a few examples. Tow hitches are commonly mounted with bolts or other fasteners to the chassis, but in other examples, the tow hitch can be integrally formed with the chassis and/or attached in other ways such as via welding. Typically, but not always, the trailer hitch is coupled to a trailer coupler that is secured to the towed object. There are a number of types of tow hitches. For example, the tow hitch can include receiver type and fixed drawbar type hitches. Receiver type hitches can include a receiver mounted to the chassis and a removable mount that is connected to the receiver. In one form, the receiver is in the form of a receiver tube that defines a receiver opening in which the removable mount is mounted, such as via a bolt or other fastener, and/or otherwise connected. The removable mount can for example include one or more ball mounts, hitch bike racks, cargo carriers, and/or other hitch mounted accessories. Fixed drawbar type hitches are typically, but not always, built as a unitary piece that is mounted to the chassis. The fixed drawbar type hitch normally includes one or more holes for a trailer ball or other mounts. The trailer mounts can for instance take the form of a tow ball to allow swiveling and articulation of a trailer; a knuckle coupling; a tow pin or a tow hook with a trailer loop coupling; and/or a pintle and lunette ring coupling. The tow hitches can for instance include Society of Automotive Engineers (SAE) class I, II, III, IV, and V hitches.

"Trailer" generally refers to an unpowered vehicle towed by another vehicle. For instance, a trailer can include a nonautomotive vehicle designed to be hauled by road, such as a vehicle configured to transport cargo, to serve as a temporary (or permanent) dwelling, and/or acting as a temporary place of business. Some non-limiting examples of trailers include open carts, semi-trailers, boat trailers, and mobile homes, to name a just few. Typically, trailers lack a power train for propelling themselves over long distances and require another powered vehicle to move them. However, trailers may include a power source, such as a battery or generator, for powering auxiliary equipment.

"Transceiver" generally refers to a device that includes both a transmitter and a receiver that share common circuitry and/or a single housing. Transceivers are typically, but not always, designed to transmit and receive electronic signals, such as analog and/or digital radio signals.

"Transmit" generally refers to causing something to be transferred, communicated, conveyed, relayed, dispatched, or forwarded. The concept may or may not include the act of conveying something from a transmitting entity to a receiving entity. For example, a transmission may be received without knowledge as to who or what transmitted it. Likewise the transmission may be sent with or without knowledge of who or what is receiving it. To "transmit" may include, but is not limited to, the act of sending or broadcasting electromagnetic energy at any suitable frequency in the electromagnetic spectrum. Transmissions may include digital signals which may define various types of binary data such as datagrams, packets and the like. A transmission may also include analog signals.

"Transverse" generally refers to things, axes, straight lines, planes, or geometric shapes extending in a non-parallel and/or crosswise manner relative to one another. For example, when in a transverse arrangement, lines can extend at right angles or perpendicular relative to one another, but the lines can extend at other non-straight angles as well such as at acute, obtuse, or reflex angles. For instance, transverse lines can also form angles greater than zero (0) degrees such that the lines are not parallel. When extending in a transverse manner, the lines or other things do not necessarily have to intersect one another, but they can.

"Vehicle" generally refers to a machine that transports people and/or cargo. Common vehicle types can include land based vehicles, amphibious vehicles, watercraft, aircraft, and space craft. By way of non-limiting examples, land based vehicles can include wagons, carts, scooters, bicycles, motorcycles, automobiles, buses, trucks, semi-trailers, trains, trolleys, and trams. Amphibious vehicles can for example include hovercraft and duck boats, and watercraft can include ships, boats, and submarines, to name just a few examples. Common forms of aircraft include airplanes, helicopters, autogiros, and balloons, and spacecraft for instance can include rockets and rocket powered aircraft. The vehicle can have numerous types of power sources. For instance, the vehicle can be powered via human propulsion, electrically powered, powered via chemical combustion, nuclear powered, and/or solar powered. The direction, velocity, and operation of the vehicle can be human controlled, autonomously controlled, and/or semi-autonomously controlled. Examples of autonomously or semi-autonomously controlled vehicles include Automated Guided Vehicles (AGVs) and drones.

"Vision System" generally refers to one or more devices that collect data and form one or more images by a computer and/or other electronics to determine an appropriate position and/or to "see" an object. The vision system typically, but not always, includes an imaging-system that incorporates hardware and software to generally emulate functions of an eye, such as for automatic inspection and robotic guidance. In some cases, the vision system can employ one or more video cameras, Analog-to-Digital Conversion (ADC), and Digital Signal Processing (DSP) systems. By way of a non-limiting example, the vision system can include a charge-coupled device for inputting one or more images that are passed onto a processor for image processing. A vision system is generally not limited to just the visible spectrum. Some vision systems image the environment at infrared (IR), visible, ultraviolet (UV), and/or X-ray wavelengths. In some cases, vision systems can interpret three-dimensional surfaces, such as through binocular cameras.

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

The term "or" is inclusive, meaning "and/or".

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

| Reference Numbers | |
|---|---|
| 100 | trailer hauling system |
| 105 | pilot vehicle |
| 110 | TOAD |
| 115 | trailer |
| 205 | TOAD interface |
| 210 | TOAD tow hitch |
| 215 | trailer tow coupler |
| 220 | trailer harness |
| 230 | trailer charge umbilical |
| 305 | body |
| 308 | powertrain system |
| 310 | engine |
| 315 | generator |
| 320 | transmission |
| 325 | wheels |
| 330 | tow ball |
| 405 | fifth-wheel coupling |
| 410 | folding sides |
| 415 | bumper |
| 505 | TOAD |
| 605 | TOAD |
| 610 | electric motors |
| 705 | TOAD |
| 710 | body |
| 715 | notch area |
| 805 | TOAD |
| 905 | TOAD |
| 1005 | TOAD |
| 1100 | trailer hauling system |
| 1105 | pilot vehicle |

-continued

| Reference Numbers | |
|---|---|
| 1110 | TOAD |
| 1115 | trailer |
| 1120 | vehicle tow hitch |
| 1125 | TOAD tow coupler |
| 1130 | TOAD harness |
| 1135 | TOAD charge umbilical |
| 1205 | drawbar |
| 1210 | pivot joint |
| 1215 | drawbar cable |
| 1220 | spring-biased reel |
| 1225 | joint support plate |
| 1230 | frame |
| 1305 | body |
| 1310 | notch area |
| 1315 | actuator |
| 1405 | actuator rod |
| 1410 | extension direction |
| 1415 | retraction direction |
| 1500 | TOAD |
| 1505 | ESS |
| 1510 | power converter |
| 1515 | steering actuator |
| 1520 | electric brake actuator |
| 1525 | hydraulic brake actuator |
| 1530 | resistive heater |
| 1600 | control subsystem |
| 1605 | processor |
| 1610 | brake controller |
| 1615 | LiFi transceiver |
| 1620 | cameras |
| 1625 | parking sensors |
| 1630 | inertial measurement unit |
| 1700 | trailer hauling system |
| 1705 | pilot vehicle |
| 1710 | TOAD interface |
| 1712 | tow hitch |
| 1714 | receiver |
| 1715 | optical markers |
| 1720 | camera lens |
| 1725 | FoV |
| 1805 | processor |
| 1810 | LiFi transceiver |
| 1815 | inertial measurement unit |
| 1820 | CAN |
| 1825 | power connector |
| 1830 | pedal interceptor |
| 1835 | ABS interceptor |
| 1840 | first optical identifier |
| 1845 | second optical identifier |
| 1905 | OEM wiring |
| 1910 | ECU |
| 1915 | wheel speed sensors |
| 1920 | pedals |
| 2005 | TOAD interface wiring |
| 2010 | TOAD interface harness |

What is claimed is:

1. A trailer hauling system, comprising:
a towable autonomous dray (TOAD) configured to follow a pilot vehicle;
wherein the TOAD is an unmanned vehicle;
wherein the TOAD has one or more wheels configured to move the TOAD;
wherein the TOAD is self-powered independently of the pilot vehicle to provide motive power for hauling a trailer;
wherein the TOAD is unattached to the pilot vehicle and is configured to maintain a distance range from the pilot vehicle;
wherein the distance range is at most 1 car length; and
wherein the TOAD has a control subsystem with at most a 1 kHz bandwidth.

2. The trailer hauling system of claim 1, wherein the TOAD has one or more sensors for sensing the distance to the pilot vehicle.

3. The trailer hauling system of claim 2, wherein the control subsystem includes an optical imaging system to sense the distance at least every 1 millisecond.

4. The trailer hauling system of claim 3, further comprising:
one or more optical identifiers configured to be placed on the pilot vehicle for sensing by the imaging system.

5. The trailer hauling system of claim 1, further comprising:
a TOAD interface is configured to communicate status of the pilot vehicle to the control subsystem.

6. The trailer hauling system of claim 5, wherein the TOAD interface and the control subsystem each have a Light Fidelity (LiFi) transceiver.

7. The trailer hauling system of claim 5, wherein the TOAD interface is configured to be mounted to a tow hitch receiver of the pilot vehicle.

8. The trailer hauling system of claim 7, wherein the TOAD interface includes an impact shock absorber.

9. The trailer hauling system of claim 5, wherein the TOAD interface and the control subsystem are configured to maintain driving logs.

10. The trailer hauling system of claim 5, wherein the TOAD interface includes one or more signal interceptors to intercept signals in the pilot vehicle.

11. The trailer hauling system of claim 10, wherein the signal interceptors include an Antilock Braking System (ABS) interceptor to change braking distances.

12. The trailer hauling system of claim 10, wherein the signal interceptors include a pedal interceptor to change acceleration of the pilot vehicle.

13. The trailer hauling system of claim 5, wherein the TOAD interface is configured to communicate with a Controller Area Network (CAN) of the pilot vehicle.

14. The trailer hauling system of claim 5, wherein the TOAD interface is configured to issue an alarm when the pilot vehicle accelerates or decelerates too rapidly.

15. The trailer hauling system of claim 5, wherein the TOAD interface is configured to synchronize with the control subsystem to confirm authorized use.

16. The trailer hauling system of claim 15, wherein the TOAD is configured to follow a second preauthorized pilot vehicle while moving.

17. The trailer hauling system of claim 5, wherein the TOAD interface and the control subsystem each include an Inertial Measurement Unit (IMU).

18. A method, comprising:
hitching a trailer to a towable autonomous dray (TOAD);
wherein the TOAD includes a powertrain for moving the TOAD;
following a pilot vehicle with the TOAD;
towing the trailer via motive power from the powertrain of the TOAD;
derating performance of the pilot vehicle by sending a sending a simulated signal in the pilot vehicle to reduce the performance of the pilot vehicle to coincide with performance of the TOAD;
wherein the performance of the pilot vehicle is braking distance;
wherein the simulated signal is a simulated wheel speed signal; and wherein said derating includes extending a braking distance of the pilot vehicle to reduce collision risk between the TOAD and the pilot vehicle.

\* \* \* \* \*